(12) United States Patent  
Takahashi et al.

(10) Patent No.: US 12,167,389 B2
(45) Date of Patent: Dec. 10, 2024

(54) TERMINAL AND RADIO COMMUNICATION METHOD

(71) Applicant: NTT DOCOMO, INC., Tokyo (JP)

(72) Inventors: Yuki Takahashi, Tokyo (JP); Shohei Yoshioka, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 331 days.

(21) Appl. No.: 17/625,580

(22) PCT Filed: Jul. 10, 2019

(86) PCT No.: PCT/JP2019/027421
§ 371 (c)(1),
(2) Date: Jan. 7, 2022

(87) PCT Pub. No.: WO2021/005770
PCT Pub. Date: Jan. 14, 2021

(65) Prior Publication Data
US 2022/0295519 A1 Sep. 15, 2022

(51) Int. Cl.
*H04W 4/00* (2018.01)
*H04L 1/08* (2006.01)
*H04W 72/0446* (2023.01)
*H04W 72/1268* (2023.01)

(52) U.S. Cl.
CPC .......... *H04W 72/1268* (2013.01); *H04L 1/08* (2013.01); *H04W 72/0446* (2013.01)

(58) Field of Classification Search
CPC .......... H04W 72/1268; H04W 72/0446; H04L 1/08; H04L 1/0003; H04L 1/0009; H04L 1/1819; H04L 5/0044; H04L 5/0094

USPC ................................................. 370/329, 330
See application file for complete search history.

(56) References Cited

U.S. PATENT DOCUMENTS

| 2016/0269939 | A1* | 9/2016 | Papasakellariou | H04L 1/189 |
| 2021/0194656 | A1* | 6/2021 | Luo | H04L 1/08 |
| 2021/0385036 | A1* | 12/2021 | Bae | H04L 5/0044 |
| 2022/0104224 | A1* | 3/2022 | Choi | H04L 5/0055 |

(Continued)

FOREIGN PATENT DOCUMENTS

WO 2018204514 A1 11/2018

OTHER PUBLICATIONS

3GPP TSG RAN WG1 #96; R1-1902178 "Considerations on PUSCH enhancements for URLLC" Sony; Athens, Greece; Feb. 25-Mar. 1, 2019 (7 pages).

(Continued)

*Primary Examiner* — Chuong T Ho
(74) *Attorney, Agent, or Firm* — Osha Bergman Watanabe & Burton LLP

(57) ABSTRACT

An aspect of a terminal according to the present disclosure includes: a receiving section that receives information for indicating transmission of an uplink shared channel; and a control section that controls, when dividing the uplink shared channel into a plurality of segments and transmitting the segments, to apply, to at least one segment, at least one of a different redundancy version from a redundancy version that is configured for the uplink shared channel and a value different from a parameter value relating to an overhead that is configured for the uplink shared channel.

9 Claims, 15 Drawing Sheets

(56) References Cited

U.S. PATENT DOCUMENTS

2022/0231789 A1* 7/2022 Ying ................ H04L 5/0053
2022/0279549 A1* 9/2022 Takahashi ........... H04L 5/0044

OTHER PUBLICATIONS

3GPP TSG RAN WG1 #96; R1-1902806 "PUSCH enhancements for URLLC" NTT DOCOMO, Inc.; Athens, Greece; Feb. 25-Mar. 1, 2019 (8 pages).
3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).
International Search Report issued in International Application No. PCT/JP2019/027421, mailed Feb. 10, 2020 (3 pages).
Written Opinion issued in International Application No. PCT/JP2019/027421; Dated Feb. 10, 2020 (3 pages).
Office Action issued in Russian Application No. 2022101297/07(002592) mailed on Nov. 23, 2022 (10 pages).

* cited by examiner

| MCS Index $I_{MCS}$ | Modulation Order $Q_m$ | Target code Rate x [1024] R | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| ... | ... | ... | ... |
| 28 | 6 | 948 | 5.5547 |
| 29 | 2 | reserved | |
| 30 | 4 | reserved | |
| 31 | 6 | reserved | |

FIG. 3

| $rv_{id}$ INDICATED BY DCI THAT SCHEDULES PUSCH | $rv_{id}$ APPLIED TO nth TRANSMISSION OCCASION | | | |
|---|---|---|---|---|
| | $n \bmod 4 = 0$ | $n \bmod 4 = 1$ | $n \bmod 4 = 2$ | $n \bmod 4 = 3$ |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

FIG. 4

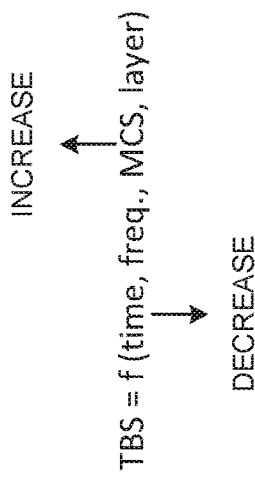
FIG. 5A
FIG. 5C
FIG. 5E
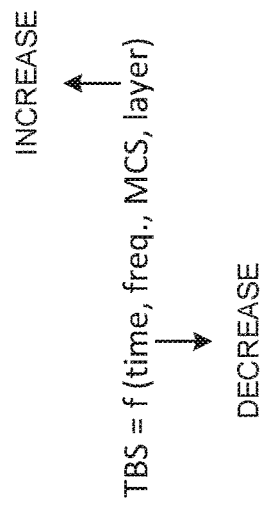
FIG. 5B
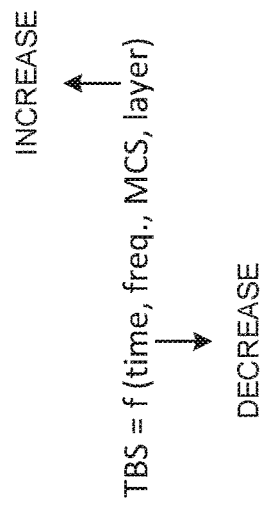
FIG. 5D

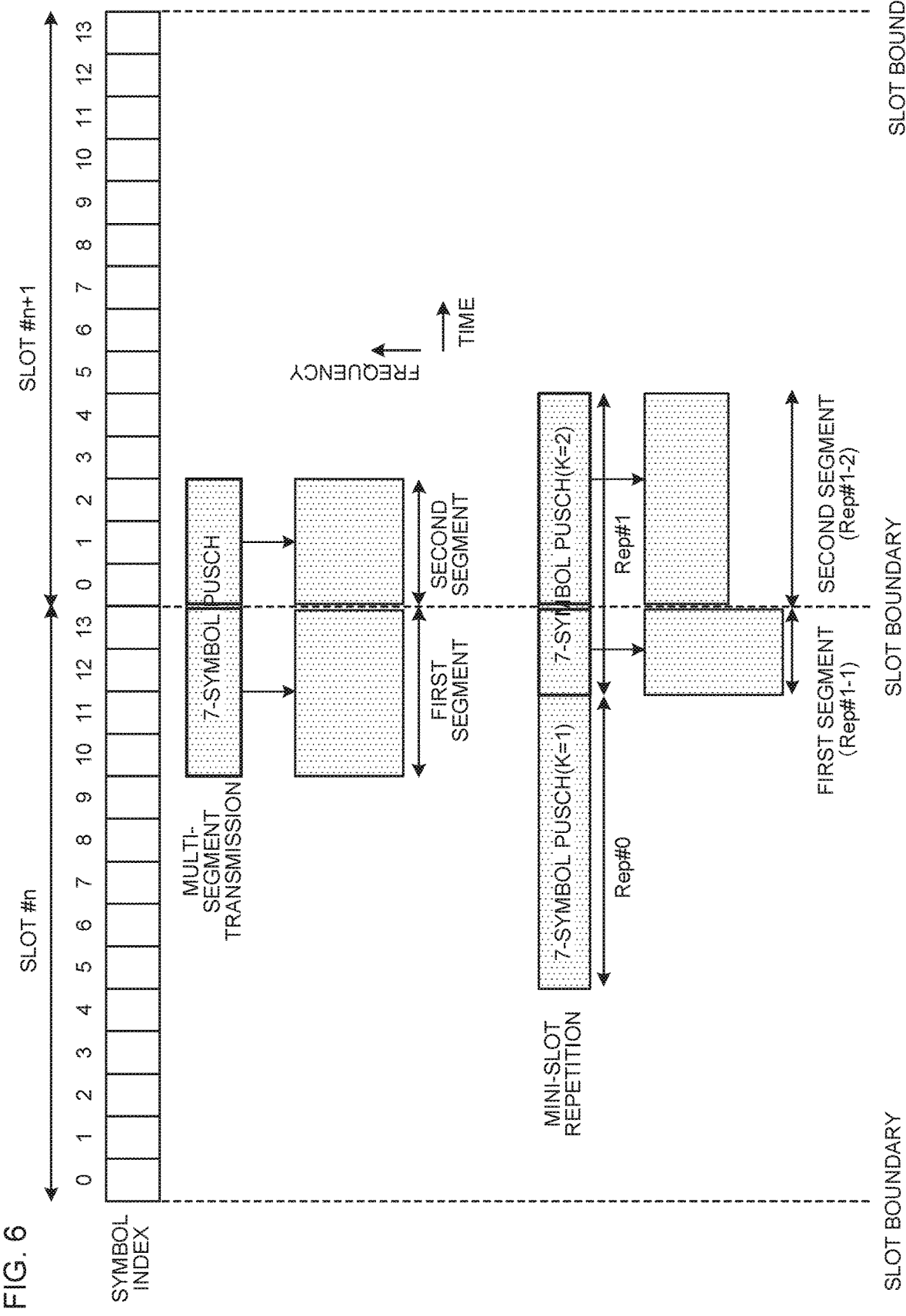

TERMINAL AND RADIO COMMUNICATION METHOD

TECHNICAL FIELD

The present disclosure relates to a terminal and a radio communication method in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "New Radio (NR)," "3GPP Rel. 15 (or later versions)," and so on) are also under study.

In existing LTE systems (for example, 3GPP Rel. 8 to Rel. 14), a user terminal (UE (User Equipment)) controls reception of a downlink shared channel (for example, PDSCH (Physical Downlink Shared Channel)), based on downlink control information (DCI, also referred to as DL assignment, or the like) from a base station. The user terminal controls transmission of an uplink shared channel (for example, PUSCH (Physical Uplink Shared Channel)), based on DCI (also referred to as UL grant or the like).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

It is under study that a future radio communication system (for example, NR) will support scheduling of at least one of a given channel and signal (also referred to as the "channel/signal") across a slot boundary at a given transmission occasion. The channel/signal may be, for example, a shared channel (for example, an uplink shared channel (for example, PUSCH)) or a downlink shared channel (for example, PDSCH)).

In this case, it is under study that UE controls transmission or reception by dividing a shared channel that is scheduled across a slot boundary (or over the slot boundary) into a plurality of segments. However, how to control the shared channel when the shared channel is divided into segments for transmission or reception is a problem.

An object of the present disclosure is to provide a terminal and a radio communication method that are capable of appropriately performing communication even when a given channel/signal is divided for transmission or reception.

Solution to Problem

A terminal according to an aspect of the present disclosure includes: a receiving section that receives information for indicating transmission of an uplink shared channel; and a control section that controls, when dividing the uplink shared channel into a plurality of segments and transmitting the segments, to apply, to at least one segment, at least one of a different redundancy version from a redundancy version that is configured for the uplink shared channel and a value different from a parameter value relating to an overhead that is configured for the uplink shared channel.

Advantageous Effects of Invention

According to one aspect of the present disclosure, communication can be appropriately performed even when a given channel/signal is divided for transmission or reception.

BRIEF DESCRIPTION OF DRAWINGS

FIG. 3 is a diagram to show an example of an MCS table;

FIG. 4 is a diagram to show examples of redundancy versions applied to a plurality of PUSCH transmissions (for example, a repeated PUSCH);

FIGS. 5A to 5E are diagrams to show examples of transmission conditions or transmission parameters that are applied to a plurality of segments;

FIG. 6 is a diagram to show other examples of transmission conditions or transmission parameters that are applied to a plurality of segments;

DESCRIPTION OF EMBODIMENTS (Multi-Segment Transmission)

In an existing system (for example, 3GPP Rel. 15), it has been studied that a UE allocates a time domain resource (for example, a given number of symbols) to an uplink shared channel (for example, a PUSCH) or a downlink shared channel (for example, a PDSCH) at a certain transmission occasion (also referred to as a period, opportunity, and the like) within a single slot.

The UE may transmit one or a plurality of transport blocks (TBs) by using a PUSCH allocated to a given number of consecutive symbols in a slot at a certain transmission occasion. The UE may also transmit one or a plurality of TBs by using a PDSCH allocated to a given number of consecutive symbols in a slot at a certain transmission occasion.

Figure 1:
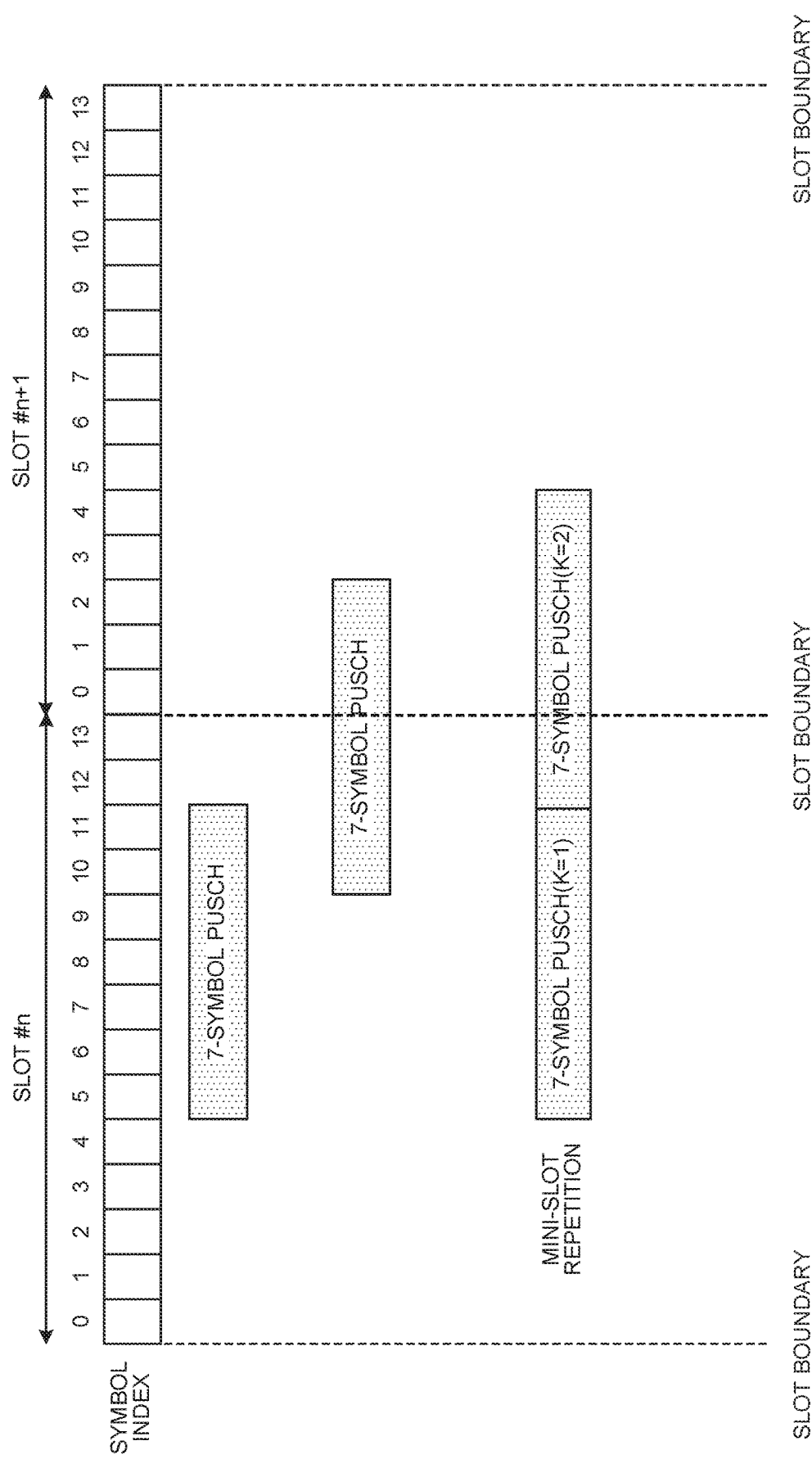
FIG. 1 is a diagram to show an example of allocation of shared channels (for example, PUSCHs)

On the other hand, in a future radio communication system (for example, Rel. 16 or later versions), it is assumed that a time domain resource may be allocated to a PUSCH or a PDSCH over a slot boundary (or across a plurality of slots) at a certain transmission occasion (see FIG. 1). FIG. 1 shows a case where some PUSCHs are allocated to given consecutive numbers (7 symbols in this case) within one slot, while other PUSCH are allocated across (or crossing) a slot boundary.

Specifically, the PUSCH that is allocated to the symbols #10 to #13 in slot #n and the symbols #0 to #3 in slot™n+1 is transmitted across a slot boundary. Further, it is assumed that, when a PUSCH is repeatedly transmitted over a plurality of transmission occasions as shown in FIG. 1, at least a part of the transmission occasions or repeated transmissions may be transmitted across a slot boundary.

Transmission of a channel/signal using a time domain resource allocated across a slot boundary (over a plurality of slots) is also referred to as multi-segment transmission, 2-segment transmission, cross-slot boundary transmission, discontinuous transmission, multiple division transmission, or the like. Likewise, reception of a channel/signal transmitted across a slot boundary is also referred to as multi-segment reception, two-segment reception, cross-slot boundary reception, discontinuous reception, multiple division reception, or the like.

Figure 2:
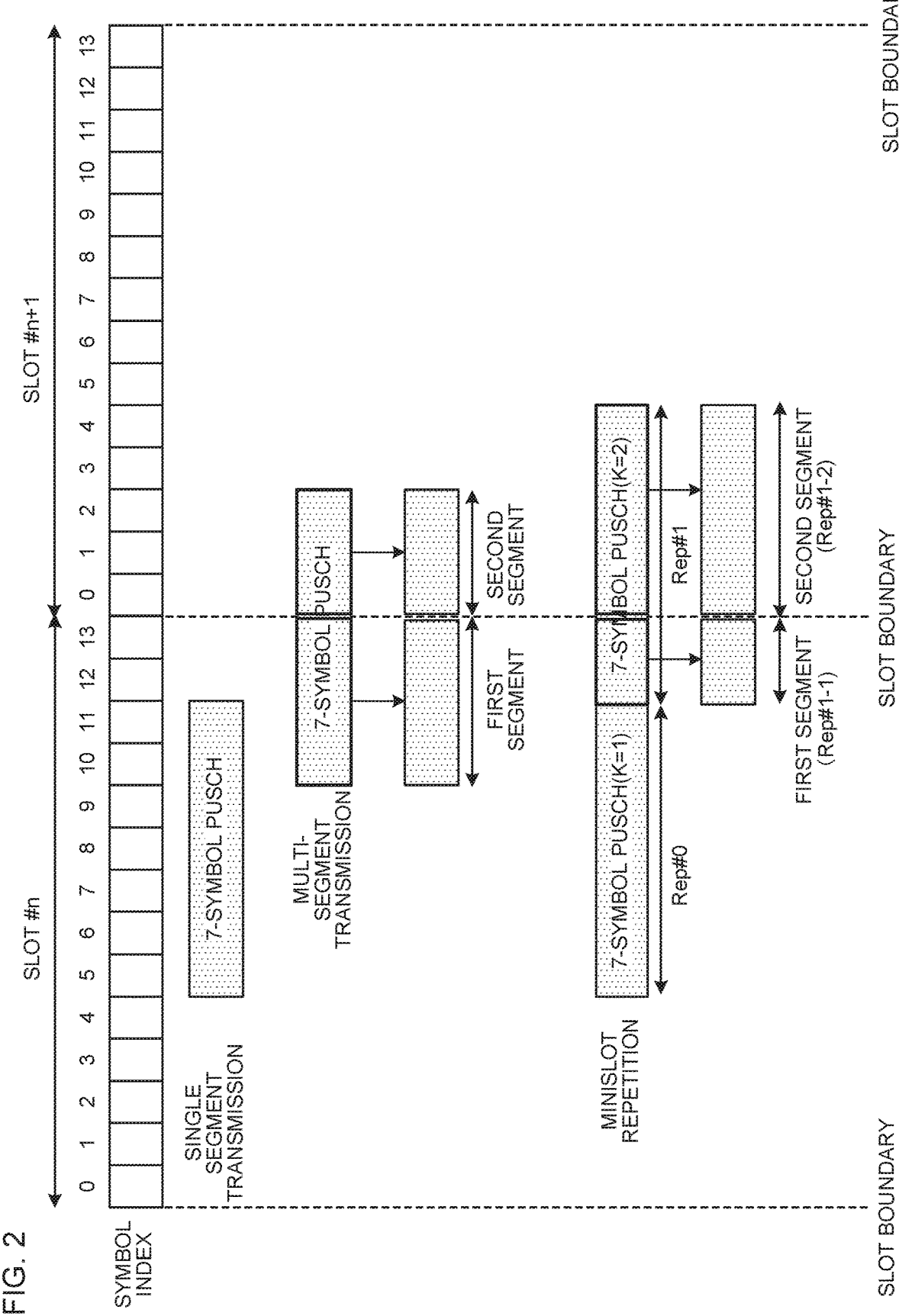
FIG. 2 is a diagram to show examples of multi-segment transmissions.

FIG. 2 is a diagram to show examples of multi-segment transmissions. Note that, although PUSCH multi-segment transmissions are illustrated in FIG. 2, it may be replaced with other signal/channels (for example, PDSCHs and the like). Although the following description illustrates a case where dividing into each segment is performed based on a slot boundary, the criterion for dividing into segments is not limited to the slot boundary. Further, the following description illustrates a case where the symbol length of a PUSCH is 7 symbols, but, without limitation, any symbols longer than 2-symbol length can be similarly applied.

In FIG. 2, a UE may control transmission of a PUSCH allocated (or scheduled) within one slot or a PUSCH allocated across a plurality of slots, based on a given number of segments. When a time domain resource over one or more slots is allocated to a PUSCH at a certain transmission occasion, the UE may divide (or separate, split) the PUSCH into a plurality of segments to control the transmission process. For example, the UE may map each segment that is divided based on the slot boundary to a given number of allocated symbols in the corresponding slot of each segment.

Here, the "segment" may be a given number of symbols in each slot allocated to one transmission occasion or data transmitted by the given number of symbols. For example, if a leading symbol of a PUSCH that is allocated to one transmission occasion is in a first slot and a last symbol of the PUSCH is in a second slot, one or more symbols included in the first slot may be defined as a first segment, and one or more symbols included in the second slot may be defined as a second segment with regard to the PUSCH.

Note that the "segment" is a given data unit and may be at least a part of one or a plurality of TBs. For example, each segment may be constituted with one or a plurality of TBs, one or a plurality of code blocks (CBs), or one or a plurality of code block groups (CBGs). Note that 1 CB is a unit for coding TB, and 1 CB may be a block obtained by dividing a TB into one or a plurality blocks (CB segmentation). Further, 1 CBG may include a given number of CBs. Note that the divided segment may also be referred to as a short segment.

The size (the number of bits) of each segment may be determined based on, for example, at least one of: the number of slots to which a PUSCH is allocated; the number of symbols allocated in each slot; and the ratio of the number of symbols allocated in each slot. Also, the number of segments may be determined based on the number of slots to which a PUSCH is allocated.

For example, a PUSCH that is allocated to symbols #5 to #11 in slot #n is transmitted within a single slot (a single segment) without crossing a slot boundary. As such, PUSCH transmission without crossing a slot boundary (transmission of a PUSCH using a given number of symbols allocated within a single slot) may also be referred to as single-segment transmission, one-segment transmission, non-segmented transmission, or the like.

On the other hand, a PUSCH that is allocated to symbols #10 to #13 in slot #n and symbols #0 to #2 in slot #n+1 is transmitted across a slot boundary. As such, PUSCH transmission across a slot boundary (transmission of a PUSCH using a given number of symbols allocated to a plurality of slots) may also be referred to as multi-segment transmission, two-segment transmission, cross slot boundary transmission, or the like.

Further, as shown in FIG. 2, when a PUSCH is repeatedly transmitted over a plurality of transmission occasions, multi-segment transmission may be applied to at least a part of the transmission occasions. For example, in FIG. 2, a PUSCH is repeated twice, single-segment transmission is applied to the first PUSCH transmission, and multi-segment transmission is applied to the second PUSCH transmission.

Further, the repeated transmissions may be performed in one or more time units. Each transmission occasion may be provided in each time unit. Each time unit may be, for example, a slot or a time unit shorter than a slot (for example, also referred to as a mini-slot, a sub slot, a half slot, or the like). For example, FIG. 2 shows repeated transmissions using 7-symbol mini-slots, but the unit of a repeated transmission (for example, a symbol length) is not limited to that shown in FIG. 2.

Furthermore, the number of repetition being 1 may indicate that a PUSCH or PDSCH is transmitted once (not repeated).

Repeated transmission may also be referred to as slot aggregation transmission, multi-slot transmission, or the like. The number of repetition (aggregation number, aggregation factor) N may be specified to UE by at least one of a higher layer parameter (for example, "pusch-AggregationFactor" or "pdsch-AggregationFactor" of RRC IE) and DCI. In addition, transmission occasion, repetition, slot or mini-slot, and the like can be interchangeably interpreted.

In this way, cases are assumed where a PUSCH (also referred to as a nominal PUSCH) to which allocation (or a schedule) is indicated crosses a slot boundary or a symbol that cannot be used for PUSCH transmission (for example, a DL or flexible symbol) exists within a range of one transmission (for example, 7 symbols). In such cases, it is conceivable that UE divides the PUSCH into a plurality of segments (or repetitions) to control the transmission.

However, when a PUSCH is divided into a plurality of segments for transmission, how to control the transmission is a problem. For example, when UE transmits a PUSCH, a transmission is performed using a given transmission condition or transmission parameter, but how to control the transmission condition or transmission parameter of the divided segments is a problem. As an example of the transmission condition, at least one of a transport block size (TBS) and a redundancy version (RV) can be considered.

<Transport Block Size>

FIG. 3 is a diagram showing an example of an MCS table in the above-mentioned future radio communication system. Note that FIG. 3 is merely an example and the values shown are not limited, and some items (fields) may be deleted or items not shown may be added.

As shown in FIG. 3, in the future radio communication system, a table (an MCS table) that associates a modulation order, a coding rate (also referred to as an assumed coding rate, a target code rate, or the like), and an index (for example, an MCS index) indicating the modulation order and the coding rate may be defined (may be stored in a user terminal). Note that, in the MCS table, a spectral efficiency may also be associated in addition to the above three items.

A user terminal may receive DCI for scheduling a PDSCH (at least one of DL assignment and DCI formats 1_0 and 1-1) and may determine a modulation order (Qm) and a coding rate (R) used for the PDSCH, based on the MCS table (FIG. 3) and the MCS index included in the DCI.

Further, a user terminal may receive DCI for scheduling a PUSCH (at least one of UL grant and DCI formats 0_0 and 0_1) and may determine a modulation order (Qm) and a coding rate (R) used for the PUSCH, based on the MCS table (FIG. 3) and the MCS index included in the DCI.

In the future radio communication system, a user terminal may determine a TBS by using at least one of the following steps 1) to 4). Note that, although determination of a TBS for a PDSCH will be described in the following steps 1) to 4) as an example, "PDSCH" in the following steps 1) to 4) may be replaced with "PUSCH" for appropriately applying to determination of a TBS for a PUSCH.

Step 1)

A user terminal determines the number of REs ($N_{RE}$) in a slot.

Specifically, the user terminal may determine the number of REs ($N'_{RE}$) allocated to a PDSCH within 1 PRB. For example, the user terminal may determine the number of REs ($N'_{RE}$) allocated to a PDSCH within 1 PRB, based on at least one parameter represented by following Equation (1).

[Math. 1]

$$N'_{RE} = N_{sc}^{RB} \cdot N_{symb}^{sh} - N_{DMRS}^{PRB} - N_{oh}^{PRB} \quad \text{Equation (1)}$$

Here, $N^{RB}_{SC}$ is the number of subcarriers per RB, and may be, for example, $N^{RB}_{SC}=12$. $N^{sh}_{symb}$ is the number of symbols (for example, OFDM symbols) scheduled within a slot.

$N^{PRB}_{DMRS}$ is the number of REs for a DMRS per PRB within a scheduled period. The number of REs for a DMRS may include an overhead of a group relating to code division multiplexing (CDM) of the DMRS indicated by DCI (for example, at least one of DCI formats 1_0, 1_1, 0_0 and 0_1).

$N^{PRB}_{oh}$ may be a value configured by a higher layer parameter. For or example, $N^{PRB}_{oh}$ is an overhead indicated by a higher layer parameter (Xoh-PDSCH) and may be any value of 0, 6, 12 or 18. If the Xoh-PDSCH is not configured in (notified to) the user terminal, the Xoh-PDSCH may be configured to 0. Further, Xoh-PUSCH is configured to 0 in message 3 (msg3) in a random access procedure.

The user terminal may also determine the total number of REs allocated to a PDSCH ($N_{RE}$). The user terminal may determine the total number of REs allocated to a PDSCH ($N_{RE}$), based on the number of REs allocated to the PDSCH per PRB ($N'_{RE}$) and the total number of PRBs allocated to the user terminal ($n_{PRB}$) (for example, following Equation (2)).

$$N_{RE} = \min(156, N'_{RE}) \cdot n_{PRB} \quad \text{Equation (2)}$$

Note that the user terminal may quantize the number of REs allocated to a PDSCH per PRB ($N'_{RE}$) in accordance with a given rule and may determine the total number or REs allocated to the PDSCH ($N_{RE}$), based on the quantized number of REs and the total number of PRBs allocated to the user terminal ($n_{PRB}$).

Step 2)

The user terminal determines an intermediate number of information bits ($N_{info}$). Specifically, the user terminal may determine the intermediate number ($N_{info}$), based on at least one parameter represented by following Equation (3). Note that the intermediate number ($N_{info}$) may also be referred to as a temporary TBS ($TBS_{temp}$) or the like.

$$N_{info} = N_{RE} \cdot R \cdot Q_m \cdot \upsilon \quad \text{Equation (3)}$$

Here, $N_{RE}$ is the total number of REs allocated to a PDSCH. R is a coding rate associated with an MCS index, which is included in DCI, in an MCS table (for example, FIG. 3). $Q_m$ is a modulation order associated with the MCS index, which is included in the DCI, in the MCS table. $\upsilon$ is the number of PDSCH layers.

Step 3)

When the intermediate number of the information bits determined at step 2) ($N_{info}$) is not more than (or less than) a given threshold value (for example, 3824), the user terminal may quantize the intermediate number and determine the quantized intermediate number (for example, N'info). The user terminal may calculate the quantized intermediate number (N'info) by using, for example, Equation) (4).

[Math. 4]

$$N'_{info} = \max\left(24, 2^n \cdot \left\lfloor \frac{N_{info}}{2^n} \right\rfloor\right) \quad \text{Equation (4)}$$

where, $n = \max(3, \lfloor \log_2(N_{info}) \rfloor - 6)$

Further, the user terminal may find a closest TBS not less than the quantized intermediate number (N'info) by using a given table (for example, a table that associates a TBS with an index (also referred to as a quantization table, a TBS table, or the like)).

Step 4)

On the other hand, when the intermediate number of the information bits determined at step 2) ($N_{info}$) is greater than (or not less than) a given threshold value (for example, 3824), the user terminal may quantize the intermediate number ($N_{info}$) and determine the quantized intermediate number (N'info). The user terminal may calculate the quantized intermediate number (N'info) using, for example, Equation (5). Note that the round function may round up the result.

[Math. 5]

$$N'_{info} = \max\left(3840, 2^n \times \text{round}\left(\frac{N_{info} - 24}{2^n}\right)\right) \quad \text{Equation (5)}$$

where, $n = \lfloor \log_2(N_{info} - 24) \rfloor - 5$

Here, when the coding rate (R) associated with the MCS index, which is in the DCI, in the MCS table (for example, FIG. 3) is not more than (or less than) a given threshold value (for example, 1/4), the user terminal may determine the TBS, based on at least one parameter represented by following Equation (6) (for example, using Equation (6)).

[Math. 6]

$$TBS = 8 \cdot C \cdot \left\lceil \frac{N'_{info} + 24}{8 \cdot C} \right\rceil - 24 \quad \text{Equation (6)}$$

where, $C = \left\lceil \frac{N'_{info} + 24}{3816} \right\rceil$

N'info is a quantized intermediate number and may be calculated using, for example, above Equation (5). Further, C may be the number of code blocks (CB) into which a TB is divided.

On the other hand, when the coding rate (R) is greater than (or not less than) a given threshold value (for example, 1/4), as well as, the quantized intermediate number of the information bits (N'info) is greater than (or not less than) a given threshold value (for example, 8424), the user terminal may determine the TBS, based on at least one parameter represented by following Equation (7) (for example, using Equation (7)).

[Math. 7]

$$TBS = 8 \cdot C \cdot \left\lceil \frac{N'_{info} + 24}{8 \cdot C} \right\rceil - 24 \quad \text{Equation (7)}$$

where, $C = \left\lceil \frac{N'_{info} + 24}{8424} \right\rceil$

Furthermore, when the coding rate (R) is not more than (or less than) a given threshold value (for example, 1/4), and the quantized intermediate number (N'info) is not more than (or less than) a given threshold value (for example, 8424), the user terminal may determine the TBS, based on at least one parameter represented by following Equation (8) (for example, using Equation (8)).

[Math. 8]

$$TBS = 8 \cdot \left\lceil \frac{N'_{info} + 24}{8} \right\rceil - 24 \quad \text{Equation (8)}$$

In this way, it is under study that, for the future radio communication system, a user terminal determines an intermediate number of information bits ($N_{info}$), based on at least one of the number of REs ($N_{RE}$) available for a PDSCH or PUSCH in a slot, a coding rate (R), a modulation order (Qm), and the number of layers, and determines a TBS for the PDSCH or PUSCH, based on the quantized intermediate number (N'info) obtained by quantizing the intermediate number ($N_{info}$).

<Redundancy Version>

When a plurality of shared channels (for example, PUSCHs) are transmitted or a PUSCH is repeatedly transmitted, a given redundancy version (RV) is applied to each PUSCH transmission.

When a PUSCH (or a TB) is repeatedly transmitted over a plurality of transmission occasions, an RV applied to an nth transmission occasion of the TB may be determined based on a given rule. For example, for a repeated transmission of a PUSCH that is scheduled by a CRC-scrambled PDCCH (or DCI) using a given RNTI, an RV may be determined based on the information notified by the DCI and the index of the transmission occasion.

The UE may determine an RV (which may be interchangeably interpreted as an RV index, an RV value, or the like) corresponding to the nth repetition, based on the value of a given field (for example, an RV field) in the DCI that schedules the PDSCH repetition. Note that, in the present disclosure, the nth repetition may be interchangeably interpreted as the n−1th repetition (for example, a first repetition may be expressed as a 0th repetition).

For example, the UE may determine an RV index to apply to the first repetition, based on the 2-bit RV field. For example, the value of the RV field "00," "01," "10," or "11" may respectively correspond to the RV index of the first repetition '0,' '1,' '2,' or '3.'

FIG. 4 is a diagram showing an example of RV mapping for each transmission occasion. The leftmost column of the table in FIG. 4 indicates an RV index ($rv_{id}$) indicated by the RV field. The UE may determine the RV index applied to the nth transmission occasion according to this value.

For example, the UE may determine that, when the $rv_{id}$ indicated by the RV field is 0, n mod 4 (equivalent to mod (n, 4))=0, 1, 2, 3 correspond to $rv_{id}$=0, 2, 3, 1, respectively. In other words, starting from the RV indicated by the RV field, the UE may apply an RV to the right to each repetition of the RV sequence {#0, #2, #3, #1}.

Only a specific RV sequence may be supported for PUSCH repetition. The specific RV sequence may be an RV sequence (for example, an RV sequence {#0, #2, #3, #1}) including different RV indices (not including the same RV indices). Note that, in the present disclosure, an RV sequence may include one or more RV indices.

Also, more than one RV sequences may be supported for PUSCH repetition. The more than one RV sequences may include, for example, RV sequences {#0, #2, #3, #1}, {#0, #3, #0, #3}, {#0, #0, #0, #0}. The number of RV sequences to be applied may be configured according to a transmission type. For example, one RV sequence may be applied to dynamic-based PUSCH transmission where a PUSCH is scheduled in DCI, and a plurality of RV sequences may be applied to configured grant-based PUSCH transmission.

The UE may be configured with at least one of the more than one RV sequences for PUSCH repetition by higher layer signaling. For example, the UE may determine an RV index to be applied to a first repetition from the configured RV sequence, based on a 2-bit RV field. The UE may determine an RV index to be applied to an nth repetition (transmission occasion), based on the RV index applied to the first repetition, as described above with reference to the first mapping.

For example, in configured grant-based PUSCH transmission, at least one of the RV sequences {#0, #2, #3, #1}, {# , #3, #0, #3}, and {#0, #0, #0, #0} may be configured by higher layer signaling.

As described above, when transmitting a PUSCH, a transmission is performed using a given transport block size (TBS), but how to control the TBS for divided segments is a problem. Likewise, when transmitting a PUSCH, a transmission is performed using a given redundancy version (RV), but how to control the redundancy version for a plurality of divided segments is a problem.

The inventors of the present invention studied on how to apply a transmission condition, parameter, or the like to a plurality of segments of a shared channel and came up with the idea of the present invention.

The following will describe embodiments relating to the present disclosure in detail with reference to the drawings. Note that the following first to third aspects may be used alone, or at least two thereof may be applied in combination. The following description will be given by taking an uplink shared channel (for example, a PUSCH) as an example, but the applicable signal/channel is not limited to this. For example, the present embodiments may also be applied by replacing PUSCH with PDSCH and transmission with reception.

In addition, the aspects described below can be applied to at least one of a shared channel (a PUSCH or a PDSCH) to which repeated transmission (also referred to as repetition or nominal repetition) is applied and a shared channel to which repeated transmission is not applied (or the number of repetition is one).

(First Aspect)

In a first aspect, a transport block size (TBS) that is applied to each segment when a PUSCH is divided into a plurality of segments and transmitted, will be described.

When the UE divides a PUSCH (also referred to a nominal PUSCH) scheduled or allocated to a given region or given transmission occasion into a plurality of segments and transmits the segments, the UE determines a TBS of each segment after the division, based on a given condition. The given condition may be a transmission condition or a transmission parameter including at least one of time, a frequency (freq), a modulation coding scheme (MCS), and the number of layers (layer). The modulation coding scheme (MCS) may be at least one of a modulation order and a target code rate.

The UE may control TBSs of a plurality of divided segments to be the same. Further, the UE may control so that a TBS of a PUSCH before division (also referred to as the original TBS) and a TBS of each segment after division are the same. By transmitting TBs by using the same TBS among a plurality of PUSCH transmissions, the receiving side (for example, a base station in the uplink) can appropriately combine a plurality of TBs.

The UE may determine a TBS of each PUSCH transmission (for example, a single-segment PUSCH or a multi-segment PUSCH), based on conditions such as time, a frequency (freq), a modulation coding scheme (MCS), and the number of layers (layer). For example, the TBS may be determined based on steps 1) to 4) described above.

When a PUSCH is divided into a plurality of segments, allocation to each segment in the time direction (for example, the number of symbols) is smaller than allocation to the original PUSCH. Therefore, to make a TBS of each segment the same as the original TBS, other transmission condition or transmission parameter (for example, at least one of a frequency, an MCS and layer) may be changed or controlled to apply a given MCS index. For example, the UE may change the transmission condition or transmission parameter applied to each segment based on at least one of the following options 1-1 to 1-5.

<Option 1-1>

The frequency resource to be allocated (for example, the number of RBs or the number of PRBs) may be increased for at least one of a plurality of segments. In other words, the number of symbols corresponding to the time parameter is reduced by the division among the parameters for determining a TBS, which allows to increase the frequency resource corresponding to the frequency (freq) parameter (see FIGS. 5A, and 6).

For example, the UE may perform allocation by increasing the number of PRBs allocated to at least one of the plurality of segments more than the number of PRBs allocated to the PUSCH before division (also referred to as the original number of PRBs). The number of PRBs allocated to the PUSCH before division may be specified by DCI that schedules the PUSCH.

The number of PRBs allocated to each segment may be controlled to be increased by the same number. For example, when the PUSCH is divided into a first segment and a second segment, the number of PRBs allocated to the first segment and the number of PRBs allocated to the second segment may be commonly changed (for example, increased).

Alternatively, the number of PRBs allocated to each segment may be controlled to be increased separately. For example, the frequency resource to be increased (for example, the number of PRBs) may be determined based on the time resource of each segment (for example, the number of symbols). As an example, the number of PRBs in the first segment having a smaller number of symbols may be changed to be larger than the number of PRBs in the second segment having a larger number or symbols than the number or symbols of the first segment (see the repeated transmission in FIG. 6).

Information on the frequency resource applied to each segment (for example, the number of PRBs to be increased) may be predefined in a specification, or may be notified from a base station to the UE by using at least one of higher layer signaling and DCI.

By increasing the frequency resource (for example, the number of PRBs) allocated to each segment in this way, the same TBS as the original PUSCH (for example, an initially allocated PUSCH) can be maintained while maintaining or without increasing the coding rate.

<Option 1-2>

The MCS (for example, at least one of a modulation order and a target code rate) may be increased for at least one of a plurality of segments. In other words, the number of symbols corresponding to the time parameter is reduced by the division among the parameters for determining a TBS, which allows to increase the MCS (see FIG. 5B). The MCS may be at least one of a modulation order and a target code rate, or may be an MCS index.

For example, the UE may perform allocation by increasing the MCS of at least one of the plurality of segments more than the MCS of the PUSCH before division (also referred to as the original MCS). The MCS of the PUSCH before division may be specified by DCI that schedules the PUSCH.

The MCS of each segment may be controlled to be increased by the same number. For example when the PUSCH is divided into a first segment and a second segment, the MCS the first segment and the MCS of the second segment may be commonly changed (for example, increased).

Alternatively, the MCS of each segment may be controlled to be increased separately. For example, the MCS to be increased may be determined based on the time resource of each segment (for example, the number of symbols). As an example, the MCS of the first segment having a smaller number of symbols may be changed to be larger than the MCS of the second segment having a larger number of symbols than the number of symbols of the first segment.

Information on the MCS applied to each segment (for example, the MCS to be increased) may be predefined in a specification, or may be notified from a base station to the UE by using at least one of higher layer signaling and DCI.

By increasing the MCS applied to each segment in this way, the same TBS as the original PUSCH (for example, an initially allocated PUSCH) can be maintained while maintaining or without increasing allocation of the frequency resource. Further, since the frequency resource is not changed, it is possible to suppress the complicated allocation control of segmented PUSCHs.

<Option 1-3>

A specific MCS index or a specific modulation order may be applied to at least one of a plurality of segments. The specific MCS index may be a reserved MCS index. Further, the specific modulation order may be a fixed value defined in advance in a specification or a value notified or configured by the base station.

When using a specific MCS index (for example, a reserved MCS index), the UE does not use the above-mentioned four steps, but, instead, the MCS index is determined based on DCI (the MCS index is within a range from 0 to 27) transmitted by the latest PDCCH. In other words, the original TBS can be maintained without re-calculating a TBS by applying a specific MCS index or a specific modulation order.

<Option 1-4>

Figure 7:
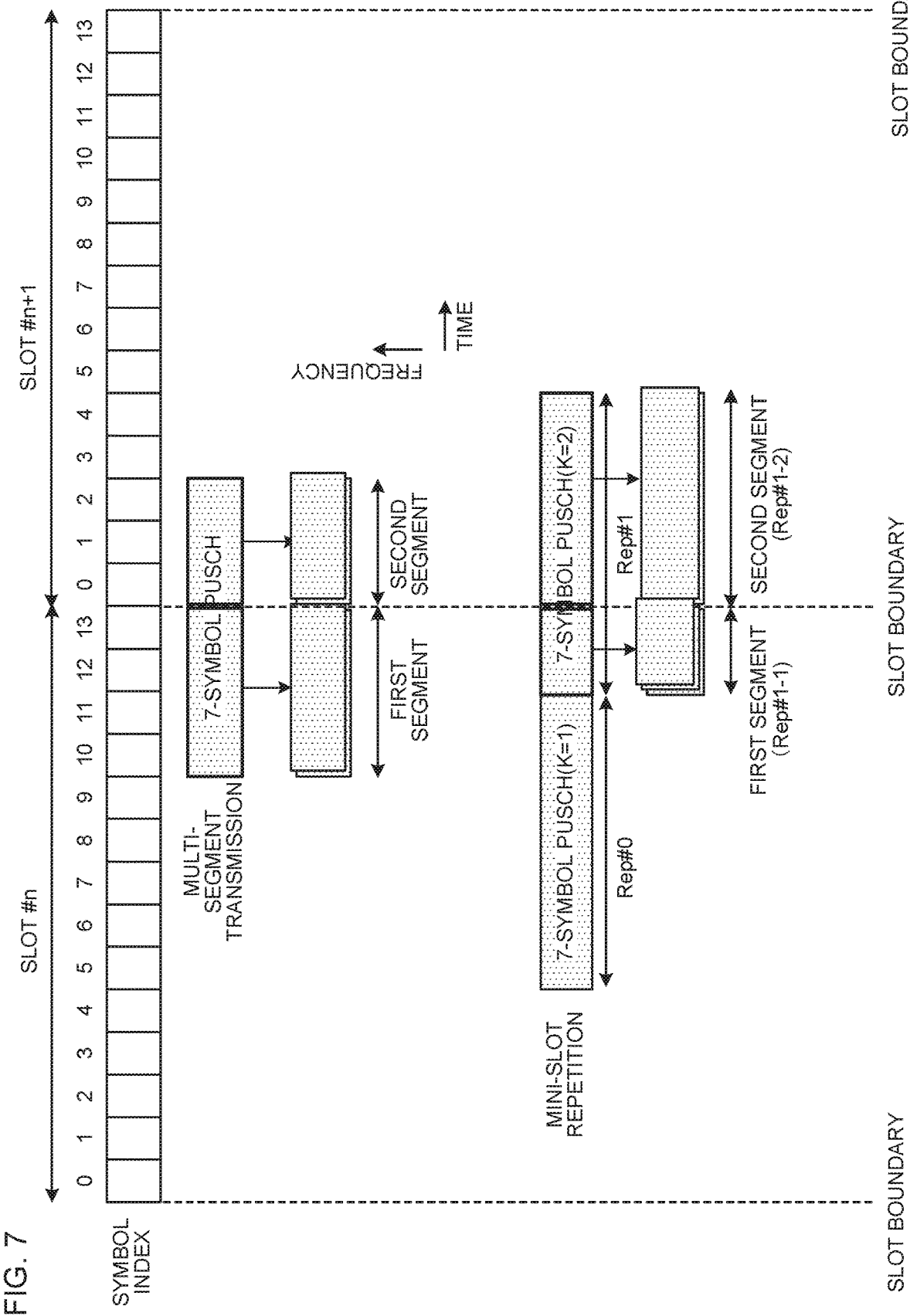
FIG. 7 is a diagram to show other examples of transmission conditions or transmission parameters that are applied to a plurality of segments.

A spatial resource (for example, the number of layers) may be increased for at least one of a plurality of segments. In other words, the number of symbols corresponding to the time parameter is reduced by the division among the parameters for determining a TBS, which allows to increase the spatial resource (see FIGS. 5D and 7).

For example, the UE may perform allocation by increasing at least one spatial resource (for example, the number of layers) of the plurality of segments more than the spatial resource of the PUSCH before division (for example, the original number of layers). The spatial resource of the PUSCH before division (for example, the number of layers) may be specified by DCI that schedules the PUSCH.

The number of layers in each segment may be controlled to be increased by the same number. For example, when the PUSCH is divided into a first segment and a second segment, the number of layers in the first segment and the number of layers in the second segment may be commonly changed (for example, increased).

Alternatively, the MCS of each segment may be controlled to be increased separately. For example, the number of layers to be increased may be determined based on the time resource of each segment (for example, the number of symbols). As an example, the number of layers in the first segment having a smaller number of symbols may be changed to be larger than the number of layers in the second segment having a larger number of symbols than the number of symbols of the first segment (see the repeated transmission in FIG. 7).

Information on the number of layers applied to each segment (for example, the number of layers to be increased) may be predefined in a specification, or may be notified from a base station to the UE using at least one of higher layer signaling and DCI.

By increasing the number of layers applied to each segment in this way, the same TBS as the original PUSCH (for example, an initially allocated PUSCH) can be maintained while maintaining or without increasing allocation of the frequency resource and MCS. Further, since the frequency resource is not changed, it is possible to suppress the complicated allocation control of the segmented PUSCHs.

<Option 1-5>

Of the above options 1-1 to 1-4, at least two options may be applied in combination. For example, the frequency resource (for example, the number of PRBs) and MCS may be increased for at least one of a plurality of segments. In other words, the number of symbols corresponding to the time parameter is reduced by the division among the parameters for determining a TBS, which allows to increase the frequency resource and MCS (see FIG. 5E).

Alternatively, the frequency resource and spatial resource may be increased, the MCS and spatial resource may be increased, or the frequency resource, MCS and spatial resource may be increased. Moreover, a parameter to be increased may be common among a plurality of segments. Alternatively, parameters to be increased may be configured separately for respective segments.

<UE Operation>

When dividing a PUSCH into a plurality of segments and transmitting the segments, the UE may autonomously (for example, automatically) adjust the transmission condition or parameter of each segment. For example, when a scheduled or configured PUSCH crosses a slot boundary, the PUSCH may be divided based on the slot boundary, and at least one of the above options 1-1 to 1-5 may be applied to the divided segments.

For example, the UE adjusts the number of PRBs in each segment when applying option 1-1. The UE adjusts the MCS of each segment when applying option 1-2. The UE adjusts the number of layers in each segment when applying option 1-4. The UE adjusts at least two of the number of PRBs, MCS, and the number of layers of each segment when applying option 1-5.

The UE may apply a given MCS index (for example, MCS=28, 29, 30, or 31) when applying option 1-3. Which MCS index to be applied may be configured by higher layer signaling or may be selected based on a target code rate. When applying option 1-3, a modulation order may be applied as the same value as a modulation order notified in an MCS field included in DCI.

Alternatively, when dividing a PUSCH into a plurality of segments and transmitting the segments, the UE may adjust the transmission condition or parameter of each segment, based on information notified from a base station. For example, the UE may determine a transmission condition or parameter to apply to each segment, based on information explicitly notified using at least one of a given field (for example, a new field) of DCI and higher layer signaling.

Alternatively, the transmission condition or parameter applied to each segment may be controlled based on a schedule status (or a communication status). For example, the UE may control to apply option 1-1 when a resource is available in the frequency direction of each segment. When the frequency resource of the original PUSCH (for example, the number of allocated PRBs) is not less than a given value, the UE may control to apply. another method (for example, any of options 1-2 to 1-4) without increasing the frequency resource.

When the MCS of the original PUSCH is not more than a given value, the UE may control to apply another method (for example, any of options 1-1, 1-3, and 1-4) without increasing the MCS.

It is conceivable that the number of PRBs to be increased is not available even if option 1-1 is selected to maintain the same TBS and MCS as the original PUSCH. In such a case, the MCS index may be changed by using option 1-5. In this case, the MCS index may be changed so that the changed MCS is in a range close to the original MCS index.

When the coding rate (for example, an effective coding rate) applied to each segment is higher than a given value (for example, 0.95), the UE may control not to transmit (for example, to skip) a PUSCH (or each segment). By skipping a transmission of a PUSCH segment that is unlikely to be decoded, it is possible to suppress an increase of the power consumption of the UE (for example, saving the battery) and reduce the influence of interference to other cells.

Note that if there is a first segment having a coding rate of a given value or less and a second segment having a coding rate higher than the given value among a plurality of segments, only the first segment may be controlled to be transmitted (the second segment is not transmitted), or both the first segment and the second segment may be controlled not to be transmitted.

Alternatively, the UE may control to transmit a PUSCH (or each segment) regardless of the coding rate applied to each segment. In other words, the UE may control to transmit a PUSCH even when the coding rate applied to each segment is higher than a given value. In this case, a base station can appropriately decode the PUSCH having a high coding rate by combining (for example, soft combining) with another PUSCH.

<Transmission Power Control>

When a PUSCH is divided into a plurality of segments (segmented PUSCHs) and transmitted, each segment may be transmitted using the same transmission power as the transmission power that is configured for the PUSCH before division (for example, the original PUSCH). In this case, the UE applies the same transmission power to each segment.

Alternatively, when a PUSCH is divided into a plurality of segments (segmented PUSCHs) and transmitted, each segment may be transmitted using a different transmission power from the transmission power that is configured for the PUSCH before division (for example, the original PUSCH). For example, if the transmission power that is configured for the original PUSCH does not exceed a given value (for example, when the power is not limited), the transmission power of each segment may be increased (or boosted).

The given value may be the allowable maximum transmission power (Pcmax), and when the transmission power of the original PUSCH is not more than the allowable maximum power where $P_{PUSCH, b, f, c}(I, j, qd, 1) \leq P_{CMAX, f, c}(i)$ is satisfied (or within a range not exceeding $P_{CMAX, f, c}(i)$), the transmission power may be increased.

The value for increasing the transmission power (a boosted power value) may be determined autonomously on the UE side (UE implementation), may be defined in a specification, or may be notified from a base station to the UE by higher layer signaling or the like. For example, when the coding rate of a segmented PUSCH is higher than (for example, doubled) the coding rate of the original PUSCH, the transmission power may be boosted by a given value (for example, 3 dB). As a result, deterioration of communication quality can be suppressed even when the coding rate of each segment is high.

(Second Aspect)

In a second aspect, a redundancy version (RV) that is applied to each segment when a PUSCH is divided into a plurality of segments and transmitted, will be described.

When the UE divides a PUSCH (also referred to as a nominal PUSCH) scheduled or allocated to a given reg on or given transmission occasion into a plurality of segments and transmits the segments, the UE determines an RV to apply to each segment after the division, based on a given condition. For example, the UE may determine an RV to apply to each segment, based on at least one of the following options 2-1 to 2-4.

<Option 2-1>

The same RV may be applied to a plurality of segments. For example, when dividing a PUSCH into a plurality of segments and transmitting the segments, the UE applies the same RV to each segment. Further, an RV that is applied to each segment may be the RV (for example, the original RV) that is configured for she PUSCH before division (for example, the original PUSCH).

The RV of the original PUSCH may be notified by DCI that schedules the original PUSCH. For example, when the RV notified by a PDCCH (or DCI) that schedules the PUSCH is 0, the UE applies 0 to the RV for the plurality of segments that are divided from the PUSCH for transmission.

In this way, by determining an RV to be applied to each segment, based on the RV that is configured in advance for the PUSCH, the complexity of scheduling can be suppressed.

<Option 2-2>

Different RVs may be applied to a plurality of segments. For example, when dividing a PUSCH into a plurality segments and transmitting the segments, the UE applies different RVs to at least two segments of the plurality of segments. Further, an RV that is applied to at least one of the plurality of segments may be the RV that is configured for the PUSCH before division (for example, the original PUSCH). An RV applied to the other segments may be selected based on a given condition.

For example, when a PUSCH is divided into two segments (a first segment and a second segment), the original RV may be applied to one of the first segment and the second segment, and another different RV from the original RV may be applied to the other. The different RV from the original RV may be determined based on a given condition (for example, any of given conditions 1 to 4 shown below).

The RV of the original PUSCH may be notified by DCI that schedules the original PUSCH. For example, when the RV notified by a PDCCH (or DCI) that schedules sa PUSCH is 0, the UE may apply RV=0 to at least one of the plurality of segments that are divided from the PUSCH for transmission and apply a different RV (for example, 2) to the other segments. At least one of the plurality of segments may be a segment transmitted first in the time direction (for example, the first segment).

<Option 2-3>

A different RV from the RV that is configured for a PUSCH before division (for example, the original PUSCH) may be applied to a plurality of segments. In this case, the same RV may be applied or different RVs may be applied to the plurality of segments.

For example, when a PUSCH is divided into two segments (a first segment and a second segment), a different RV from the original RV may be applied to both the first segment and the second segment. The different RV from the original RV may be determined based on a given condition (for example, any of given conditions 1 to 4 shown below).

When the same RV (a different RV from the RV that is configured for the original PUSCH) is configured for each segment, the RV to be applied may be selected based on a given condition. For example, when the RV notified by a PDCCH (or DCI) that schedules a PUSCH is 0, the UE may apply an RV other than 0 (for example, RV=2) to the plurality of segments that are divided from the PUSCH for transmission.

When a different RV is configured for each segment, the RV to be applied may be selected based on a given condition. For example, when the RV notified by a PDCCH (or DCI) that schedules a PUSCH is 0, the UE may apply an RV other than 0 to each segment. For example, when there are two segments, the RV of the first segment (for example, a segment transmitted first in the time direction) may be 2, and the RV of the second segment may be 3.

<Option 2-4>

A specific RV sequence may be applied to a plurality of segments. The RV sequence may be at least one of {#0, #2, #3, #1}, {#0, #3, #0, #3}, and {#0, #0, #0, #0}.

As described above, when applying a different RV from the RV that is configured for the original PUSCH before division to segmented PUSCHs, the UE may determine the changed RV based on a given condition. Note that, when dividing some PUSCHs of repeated transmissions or multiple transmissions of PUSCHs, the UE may change only the RV of the divided segmented PUSCHs, or may change the RVs of the segmented PUSCHs and other undivided PUSCH (for example, a PUSCH that is transmitted after the divided segmented PUSCH).

<When Changing Only RV of Segmented PUSCH>

[Given Condition 1]

The UE may determine an RV to be applied to a plurality of segments that are divided from the original PUSCH, based on a given RV sequence. For example, it is assumed that the RV sequence is {#0, #2, #3, #1} and the number of divided segments is two (a first segment and a second segment). In this case, the UE may apply an RV that is notified by a PDCCH (or DCI) that schedules the PUSCH to the first segment, and apply an RV to the right of the RV in the RV sequence to the second segment.

For example, when the RV notified by a PDCCH (or DCI) that schedules the PUSCH is 0, the UE may determine that the RV of the first segment is 0 and the RV of the second segment is 2.

Note that the RV sequence used is not limited to {#0, #2, #3, #1}. Other RV sequences such as {#0, #3, #0, #3} or {#0, #0, #0, #0} may also be used. The RV sequence used may be defined in advance in a specification or may be notified from a base station to the UE by using higher layer signaling or the like.

In this way, when an RV of a segment of a divided PUSCH is determined based on a given RV sequence, a decoding gain can be obtained by receiving all the segments.

[Given Condition 2]

Figure 8:
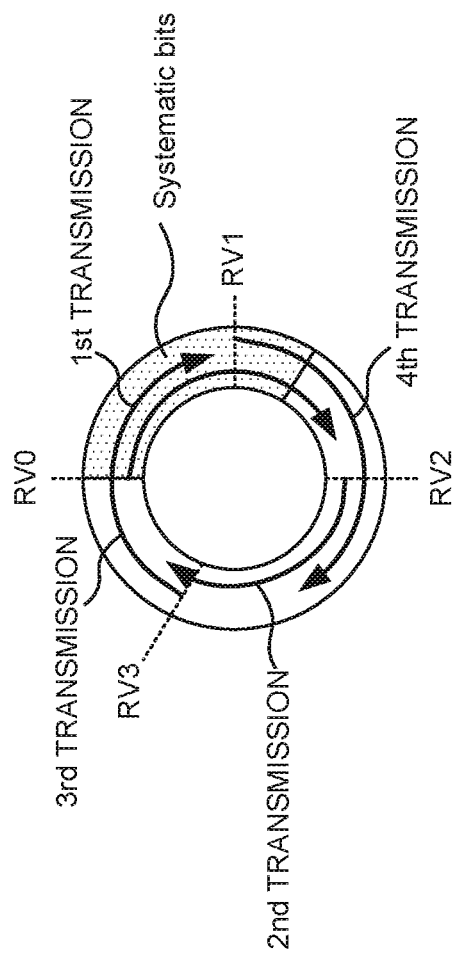
FIG. 8 is a diagram to illustrate self-decodable redundancy versions.

The UE may select an RV to be applied to a plurality of segments that are divided from the original PUSCH, from specific RV values. The specific RV value may be a self-decodable RV. The self-decodable RV may be an RV containing a large number of bits related to system information (system bits) (for example, RV=0, 3) (see FIG. 8). By receiving a PUSH to which the self-decodable RV is applied, the probability of decoding based on the PUSCH to which the RV is applied can be increased.

For example, it is assumed that the number of divided segments is 2 (a first segment and a second segment). In this case, if the RV notified by a PDCCH (or DCI) that schedules the PUSCH is a specific RV, the UE may apply the notified RV (or the notified RV and another specific RV). For example, when the RV notified by a PDCCH (or DCI) that schedules the PUSCH is 0, the UE may determine that the RV of the first segment is 0 and the RV of the second segment is another specific RV being 3.

Figure 9:
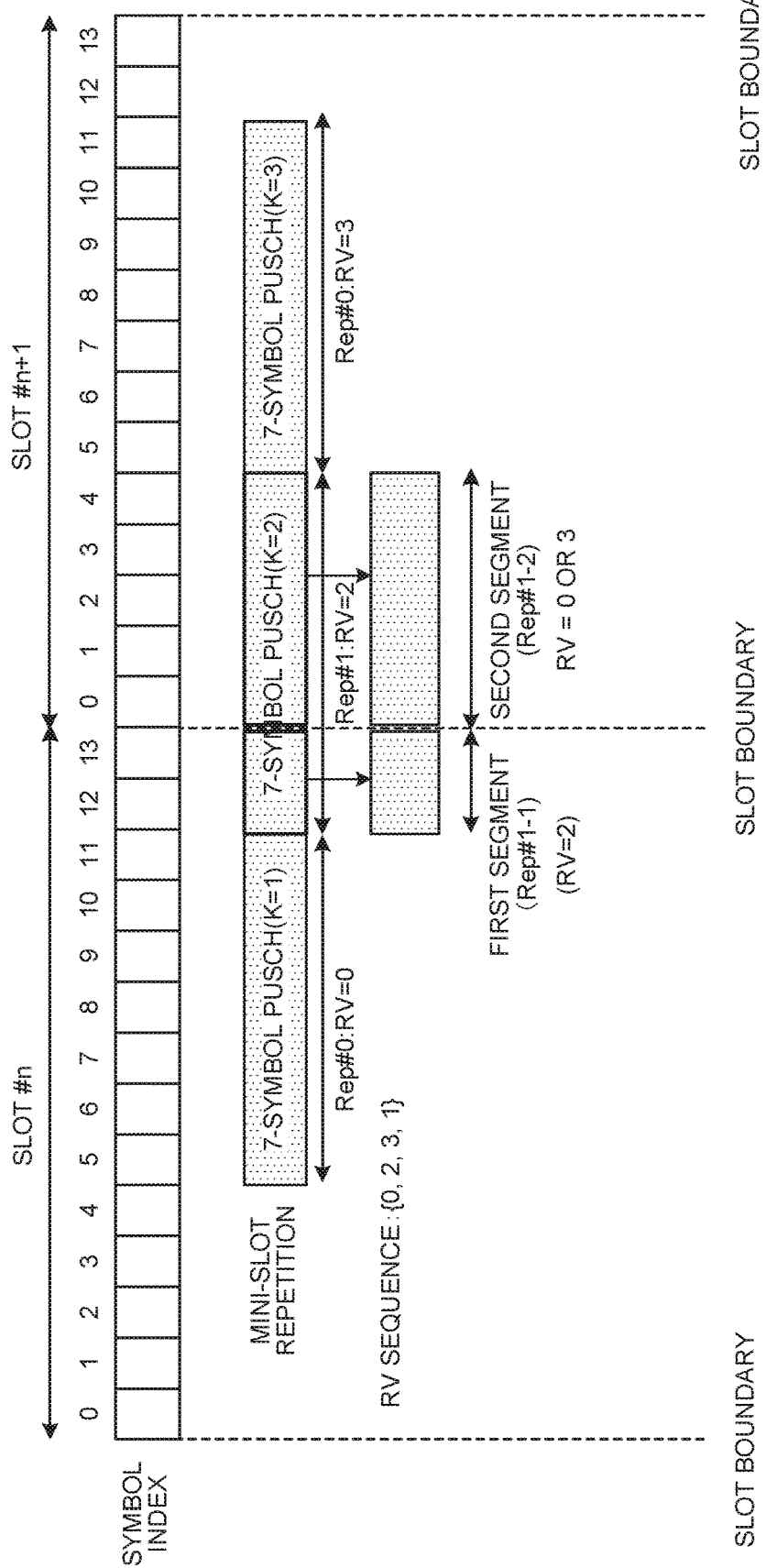
FIG. 9 is a diagram to show examples of RVs that are applied to a plurality of segments.

On the other hand, if the RV notified by a PDCCH (or DCI) that schedules the PUSCH is not a specific RV, the UE may apply the notified RV and a specific RV to the two segments respectively. For example, it is assumed that, in repeated transmissions of PUSCH, a second PUSCH transmission is divided into a plurality of segments. If the RV of the second PUSCH transmission (the PUSCH to be divided) is 2 based on a PDCCH (or DCI) that schedules repetition of the PUSCH, the UE mat determine that the RV of the first segment is 2 and the RV of the second segment is a specific RV being 0 or 3 (see FIG. 9).

Alternatively, the UE may apply a specific RV to the plurality of segments without applying the notified RV unless the RV notified by a PDCCH (or DCI) that schedules the PUSCH is a specific RV.

in this way, by applying a self-decodable RV, the decoding probability of the PUSCH to which the RV is applied can be improved, which enables improvement of the communication quality (for example, SNR).

<When Changing RV of Segmented PUSCH and RV of Other PUSCH>

When dividing some PUSCHs of repeatedly transmitted PUSCHs into a plurality of segments, the UE may change an RV of the divided segment from an RV that is configured for the original PUSCH, as well as, change an RV of a PUSCH that is transmitted thereafter. For example, for a PUSCH transmitted after transmission of a PUSCH that is divided into a plurality of segments, an RV may be determined in the similar manner as for the segments.

[Given Condition 3]

An RV that is applied to an undivided PUSCH may be determined in consideration of an RV applied to a divided segment. For example, when selecting an RV (for example, a different RV from the RV of the original PUSCH) to be applied to a divided segment based on a given RV sequence, an RV to be applied to the remaining repeated PUSCH after the segmented PUSCH may also be determined based on the given RV sequence.

For example, it is assumed that the RV sequence is {#0, #2, #3, #1} and the number of divided segments is two (a first segment and a second segment). In this case, the UE may apply an RV notified by a PDCCH (or DCI) that schedules the PUSCH to the first segment, and apply an RV next to (for example, to the right of) the notified RV in the RV sequence to the second segment.

Figure 10:
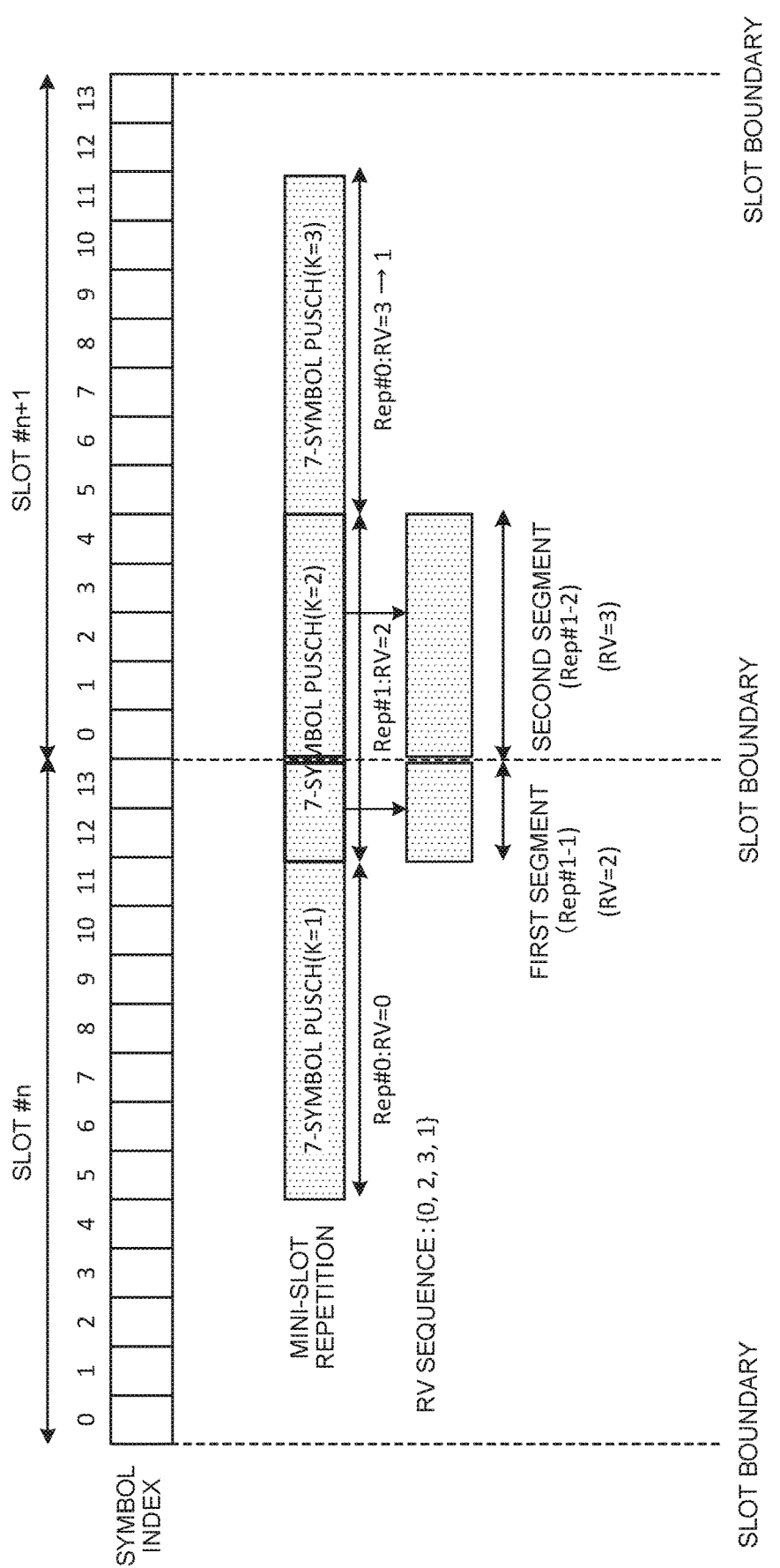
FIG. 10 is a diagram to show other examples of RVs that are applied to a plurality of segments.

For example, it is assumed that, in repeated transmissions of PUSCHs, a second PUSCH transmission is divided into a plurality of segments. If the RV of the second PUSCH transmission is 2 based on a PDCCH (or DCI) that schedules the repetition of the PUSCH, the UE may determine that the RV of the first segment is 2 and the RV of the second segment is 3. Further, the UE sets an RV applied to a PUSCH transmission following the segment to 1. In this case, the UE controls to apply different RVs even if the original RV for the PUSCH is 3 (See FIG. 10).

Note that the RV sequence used is not limited to {#0, #2, #3, #1}. Other RV sequences such as {#0, #3, #0, #3} or {#0, #0, #0, #0} may also be used. The RV sequence used may be defined in advance in a specification or may be notified from a base station to the UE by using higher layer signaling or the like.

In this way, when determining an RV of a segment of a divided PUSCH based on a given RV sequence, a decoding gain can be obtained by receiving all the segments.

[Given Condition 4]

An RV that is applied to an undivided PUSCH may be determined without considering an RV applied to a divided segment. In other words, RVs are separately determined for a divided segmented PUSCH and for an undivided PUSCH.

For example, when selecting an RV (for example, a different RV from the RV of the original PUSCH) to be applied to a divided segment based on a given RV sequence, an RV to be applied may be determined based on the given RV sequence separately for a PUSCH divided into a plurality of segments and for an undivided PUSCH.

For example, it is assumed that the RV sequence is {#0, #2, #3, #1} and the number of divided segments is two (a first segment and a second segment). In this case, the UE may apply an RV notified by a PDCCH (or DCI) that schedules the PUSCH to the first segment, and an RV next to (for example, to the right of) the notified RV in the RV sequence to the second segment. Further, the RV sequence may be applied to a PUSCH that is not divided into a plurality of segments (a PUSCH excluding a PUSCH that is divided into a plurality of segments).

For example, in repeated transmissions of PUSCHs, it is assumed that a second PUSCH transmission is divided into plurality of segments. When the RV notified by a PDCCH (or DCI) that schedules the repetition of the PUSCH is 0, the UE sets an RV to be applied to the first PUSCH transmission to 0.

Figure 11:
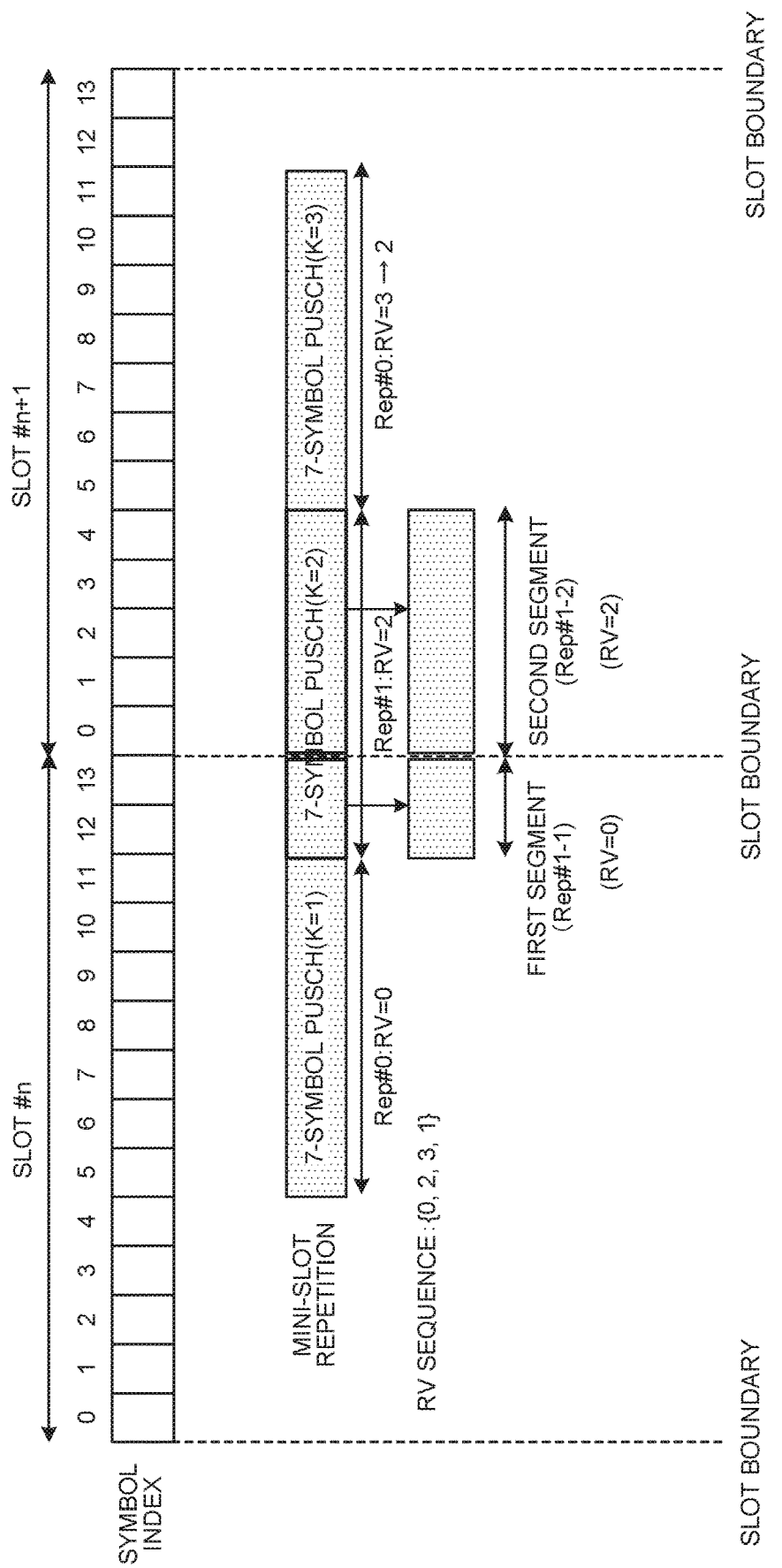
FIG. 11 is a diagram to show other example of RVs that are applied to a plurality of segments.

On the other hand, in the second PUSCH transmission that is divided into a plurality of segments, the RV of a first segment may be determined to be 0 and the RV of a second segment may be determined to be 2. Further, the UE sets an RV applied to a PUSCH transmission following the second segment to 2 (see FIG. 11). In this case, the UE controls to apply an RV sequence (for example, to apply different RVs) except for the second PUSCH even if the original RV for the third PUSCH is 3.

Note that the RV sequence used is not limited to {#0, #2, #3, ·1}. Other RV sequences such as {#0, #3, #0, #3} or {#0, #0, #0, #0} may also be used. The RV sequence used may be defined in advance in a specification or may be notified from a base station to the UE by using higher layer signaling or the like.

<Variation>

A method for determining an RV to be applied to a PUSCH transmission may be selected based on a giver condition. A UE may select a method for determining an RV based on any of the following options A to D.

[Option A]

The RV determination method may be configured based on a PUSCH scheduling type. For example, the UE may apply different RV determination methods to a dynamic grant-based PUSCH that is dynamically scheduled in DCI and to a configured grant-based PUSCH that is not dynamically scheduled in DCI. The RV determination method may be defined in a specification or may be configured from a base station to the UE by higher layer signaling or the like.

[Option B]

The RV determination method may be notified from a base station to the UE using L1 signaling. For example, the UE may select an RV determination method based on at least one of a given field, DCI format, and applied RNTI of DCI transmitted from the base station.

[Option C]

The RV determination method may be selected based on a TBS determination method (or a TBS determination method and the RV determination method may be associated with each other). For example, when using a first TBS determination method (option 1-1), the UE may apply a first RV determination method (for example, given condition 2 of 2-2).

[Option D]

The RV determination method may be notified from a base station to the UE using higher layer signaling. Alternatively, the RV determination method may be defined in advance in a specification.

(Third Aspect)

In a third aspect, a parameter relating to an overhead (for example, $N^{PRB}_{oh}$ applied to each segment when a PUSCH is divided into a plurality of segments for transmission, will be described.

The parameter relating to an overhead (for example, $N^{PRB}_{oh}$) indicates an overhead from other signals (for example, CSI-RS, PT-RS, or the like). For example, the $N^{PRB}_{oh}$ may indicate the number of resource elements (RE) of other signals in the PRB, and the $N^{PRB}_{oh}$ may be a value configured by a higher layer parameter. For example, $N^{PRB}_{oh}$ is an overhead indicated by a higher layer parameter (Xoh-PUSCH) and may be any value of 0, 6, 12 or 18. If the Xoh-PUSCH is not configured in (notified to) the user terminal, the Xoh-PUSCH may be configured to 0. The UE may determine TBS or the like, based on $N^{PRB}_{oh}$.

When the UE divides a PUSCH (also referred to as a nominal PUSCH) scheduled or allocated to a given region or given transmission occasion into a plurality of segments and transmits the segments, the UE determines $N^{PRB}_{oh}$ to be applied to each segment after the division, based on a given condition. For example, the UE may determine the $N^{PRB}_{oh}$ to apply to each segment, based on at least one of the following options 3-1 to 3-4.

<Option 3-1>

The same $N^{PRB}_{oh}$ may be applied to a plurality of segments. For example, it is assumed that, when dividing a PUSCH into a plurality of segments and transmitting the segments, the UE applies the same $N^{PRB}_{oh}$ to each segment. Further, $N^{PRB}_{oh}$ that is applied to each segment may be the $N^{PRB}_{oh}$ that is configured for the PUSCH before division (for example, the original PUSCH).

The $N^{PRB}_{oh}$ of the original PUSCH may be notified by higher layer signaling (for example, xOverhead). For example, when the $N^{PRB}_{oh}$ notified by higher layer signaling is X that is 0, the UE applies X as $N^{PRB}_{oh}$ to the plurality of segments that are divided from the PUSCH for transmission.

In this way, by determining $N^{PRB}_{oh}$ to be applied to each segment, based on the $N^{PRB}_{oh}$ that is configured for the PUSCH in advance, the complexity of scheduling can be suppressed.

<Option 3-2>

Different $N^{PRB}_{oh}$ may be applied to a plurality of segments. For example, it is assumed that, when dividing a PUSCH into a plurality of segments and transmitting the segments, the UE configures different $N^{PRB}_{oh}$ for at least two segments of the plurality of segments. Further, $N^{PRB}_{oh}$ applied to at least one of the plurality of segments may be the $N^{PRB}_{oh}$ (original $N^{PRB}_{oh}$) that is configured for the PUSCH before division (for example, the original PUSCH). $N^{PRB}_{oh}$ applied to the other segments may be different $N^{PRB}_{oh}$ from the original $N^{PRB}_{oh}$. The different $N^{PRB}_{oh}$ from the original $N^{PRB}_{oh}$ may be selected based on a given condition. For example, the UE may determine different $N^{PRB}_{oh}$ from the original $N^{PRB}_{oh}$, based on at least one of a scheduling condition, a given DCI field, and higher layer signaling.

For example, when the $N^{PRB}_{oh}$ notified by higher layer signaling is 6, the UE may apply $N^{PRB}_{oh}=6$ to at least one of the plurality of segments that are divided from the PUSCH for transmission, and may apply different $N^{PRB}_{oh}$ (for example, 0) to the other segments. At least one of the plurality of segments (for example, the first segment) may be a segment transmitted first in the time direction.

<Option 3-3>

Different $N^{PRB}_{oh}$ from the $N^{PRB}_{oh}$ that is configured for a PUSCH before division (for example, the original PUSCH) may be applied to the plurality of segments. In this case, the same $N^{PRB}_{oh}$ may be applied or different $N^{PRB}_{oh}$s may be applied to the plurality of segments.

When the same $N^{PRB}_{oh}$ (different $N^{PRB}_{oh}$ from the $N^{PRB}_{oh}$ that is configured for the original PUSCH) is configured for each segment, the $N^{PRB}_{oh}$ to be applied may be selected based on a given condition. For example, when the $N^{PRB}_{oh}$ notified by higher layer signaling is 0, the UE may apply $N^{PRB}_{oh}$ other than 0 (for example, $N^{PRB}_{oh}=6$) to the plurality of segments that are divided from the PUSCH for transmission.

When different $N^{PRB}_{oh}$ is configured for each segment, the $N^{PRB}_{oh}$ to be applied may be selected based on a given condition. For example, when the $N^{PRB}_{oh}$ notified by higher layer signaling is 0, the UE may apply $N^{PRB}_{oh}$ other than 0 to each segment. For example, when there are two segments, the $N^{PRB}_{oh}$ of the first segment (for example, a segment transmitted first in the time direction) may be 6 and the $N^{PRB}_{oh}$ of the second segment may be 12.

In this way, by assuming $N^{PRB}_{oh}$ higher than the original $N^{PRB}_{oh}$ for a segment after division, it is possible to suppress excessive resource allocation caused by a mismatch of $N^{PRB}_{oh}$ or application of a coding rate higher than a target code rate.

<Option 3-4>

Specific $N^{PRB}_{oh}$ may be applied to a plurality of segments. The specific $N^{PRB}_{oh}$ may be 0.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 12:
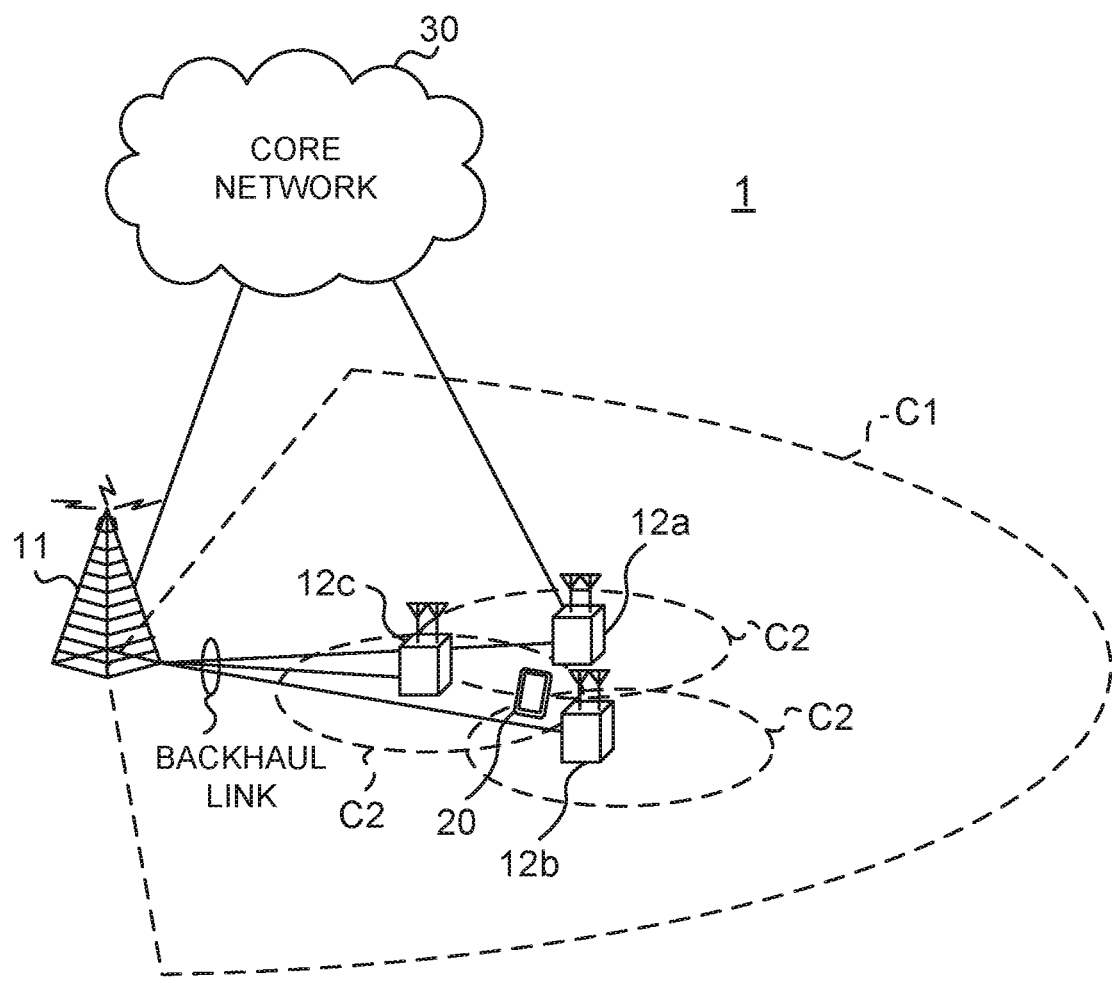
FIG. 12 is a diagram showing an example of a schematic structure of a radio communication system according to one embodiment.

FIG. 12 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCN)), a downlink control channel (Physical Downlink Control Channel (PDCCH) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are transmitted on the PDSCH. User data, higher layer control information and so on may be transmitted on the PUSCH. The Master Information Blocks (MIBs) may be transmitted on the PBCH.

Lower layer control information is transmitted on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data," and the PUSCH may be interpreted as "UL data."

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "COBESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be transmitted by means of the PUCCH. By means of the PRACH, random access preambles for establishing connections with cells may be transmitted.

Note that the downlink, the uplink, and so on in the present disclosure may be expressed without a term of "ink." In addition, various channels may be expressed without adding "Physical" to the head.

In the radio communication system 1, a synchronization signal (SS), a downlink reference signal (DL-RS), and so on may be transmitted. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be transmitted as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be transmitted as an uplink reference signal (UL-RS). Note that DMRS may be referred to as a "user terminal specific reference signal (UE-specific Reference Signal)."

(Base Station)

Figure 13:
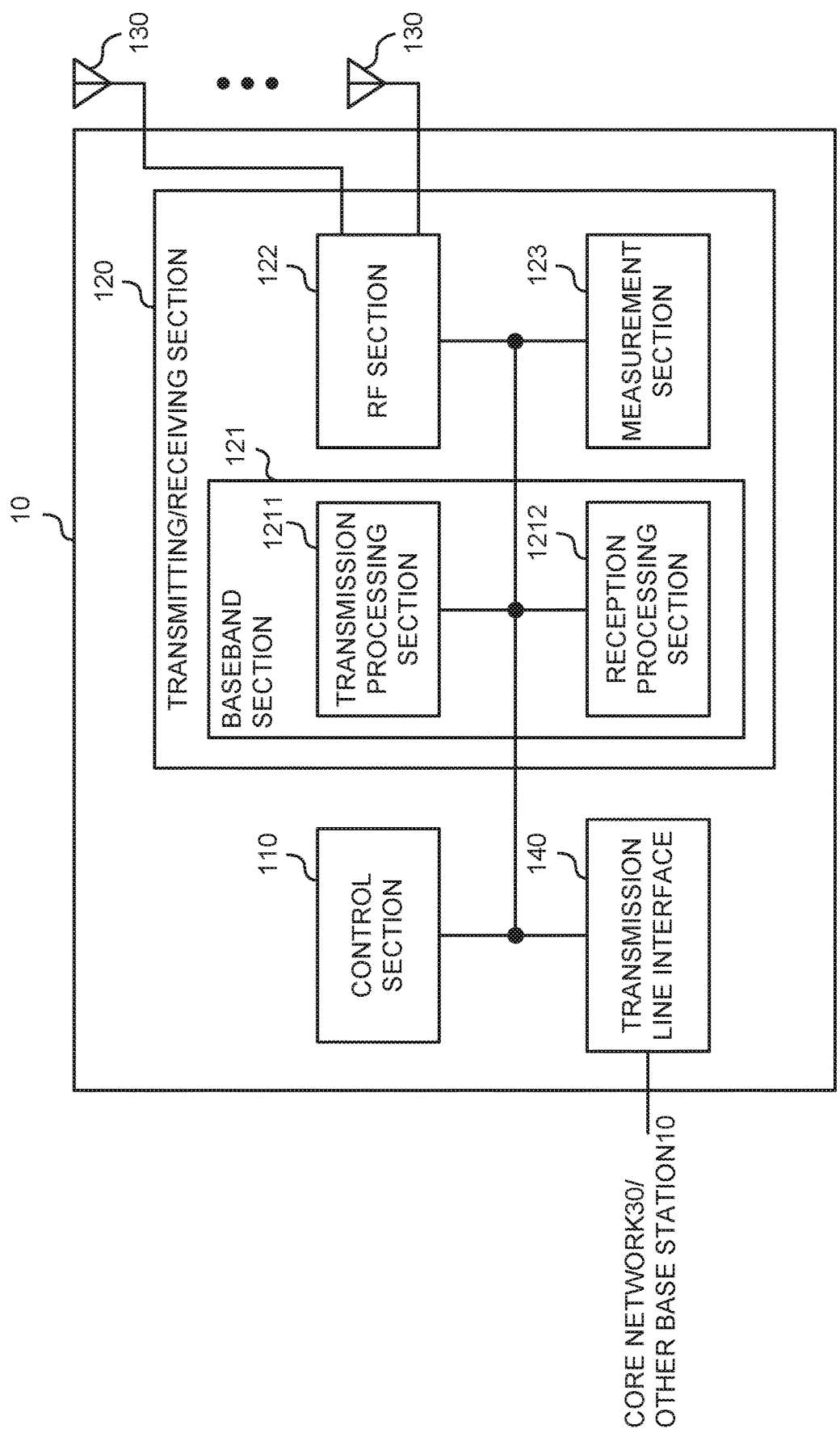
FIG. 13 is a diagram to show an example of a structure of a base station according to one embodiment.

FIG. 13 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts or the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RPM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

Note that the transmitting/receiving section 120 transmits information for indicating transmission of an uplink shared channel. The transmitting/receiving section 120 may transmit at least one of the number of repetition, information on a TBS, information on an RV, and information on an overhead.

The control section 110 may control, when the UE divides the uplink shared channel into a plurality of segments and transmits the segments, to apply a different transmission condition from the transmission condition that is configured for transmission of the uplink shared channel to at least one segment.

The control section 110 may control, when the UE divides an uplink shared channel into a plurality of segments and transmits the segments, to at least one segment, a different redundancy version from or the same redundancy version as the redundancy version that is configured for transmitting the uplink shared channel.

(User Terminal)

Figure 14:
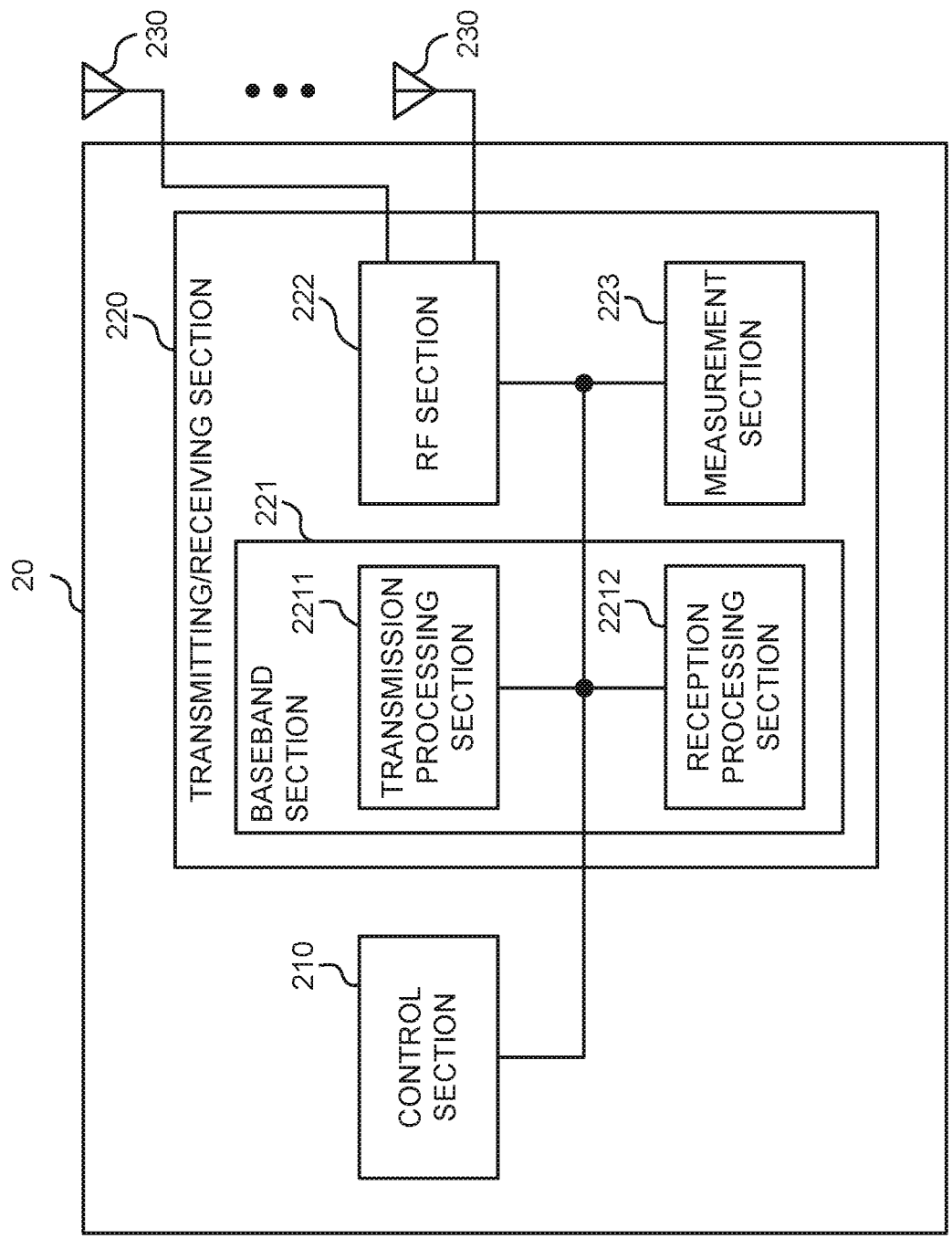
FIG. 14 is a diagram to show an example of a structure of a user terminal according to one embodiment.

FIG. 14 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be constituted as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (the RF section 222) may perform modulation to a radio frequency band, filtering, amplification, and so on, on the baseband signal, and transmit the signal or the radio frequency band through the transmitting/receiving antennas 230.

On the other hand, the transmitting/receiving section 220 the RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmtting/receiving section 220 (the measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 receives information for indicating transmission of an uplink shared channel. The transmitting/receiving section 220 may receive at least one of the number of repetition, information on a TBS, information on an RV, and information on an overhead.

The control section 210 may control, when dividing an uplink shared channel into a plurality of segments and transmitting the segments, to apply to at least one segment, a different transmission condition from the transmission condition that is configured for transmission of the uplink shared channel.

For example, the control section 210 may control the frequency resource used for transmission of at least one segment to be larger than the frequency resource that is configured for transmission of the uplink shared channel. Alternatively, the control section 210 may control to change at least one of a modulation coding scheme and a modulation order used to transmit at least one segment from at least one of a modulation coding scheme and a modulation order that is configured for transmission of the uplink shared channel. Alternatively, the control section 210 may control the spatial resource used for transmission of at least one segment to be larger than the spatial resource that is configured for transmission of the uplink shared channel. The plurality of segments may be arranged in different slots.

Further, the control section 210 may control, when dividing an uplink shared channel into a plurality of segments and transmitting the segments, to apply, to at least one segment, at least one of: a different redundancy version from the redundancy version that is configured for the uplink shared channel; and a different value from a parameter value relating to the overhead that is configured for the uplink shared channel. Alternatively, when dividing an uplink shared channel into a plurality of segments and transmitting the segments, the control section 210 may control to apply, to the plurality of segments, at least one of: the same redundancy version as the redundancy version that is configured for the uplink shared channel; and the same value as the parameter value relating to the overhead that is configured for the uplink shared channel.

For example, the control section 210 may apply at least one of a specific redundancy version and a specific parameter value relating to the overhead to at least one of the plurality of segments. When dividing some uplink shared channels among a plurality of repeatedly transmitted uplink shared channels into a plurality of segments and transmitting the segments, the control section 210 may apply, to the uplink shared channel that is transmitted without being divided into a plurality of segments, the same redundancy version as the redundancy version that is configured for transmission of the uplink shared channels. Alternatively, when dividing some uplink shared channels among a plurality of repeatedly transmitted uplink shared channels into a plurality of segments and transmitting the segments, the control section 210 may apply, to the uplink shared channel that is transmitted without being divided into a plurality of segments, a different redundancy version from the redundancy version that is configured for transmission of the uplink shared channels.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 15:
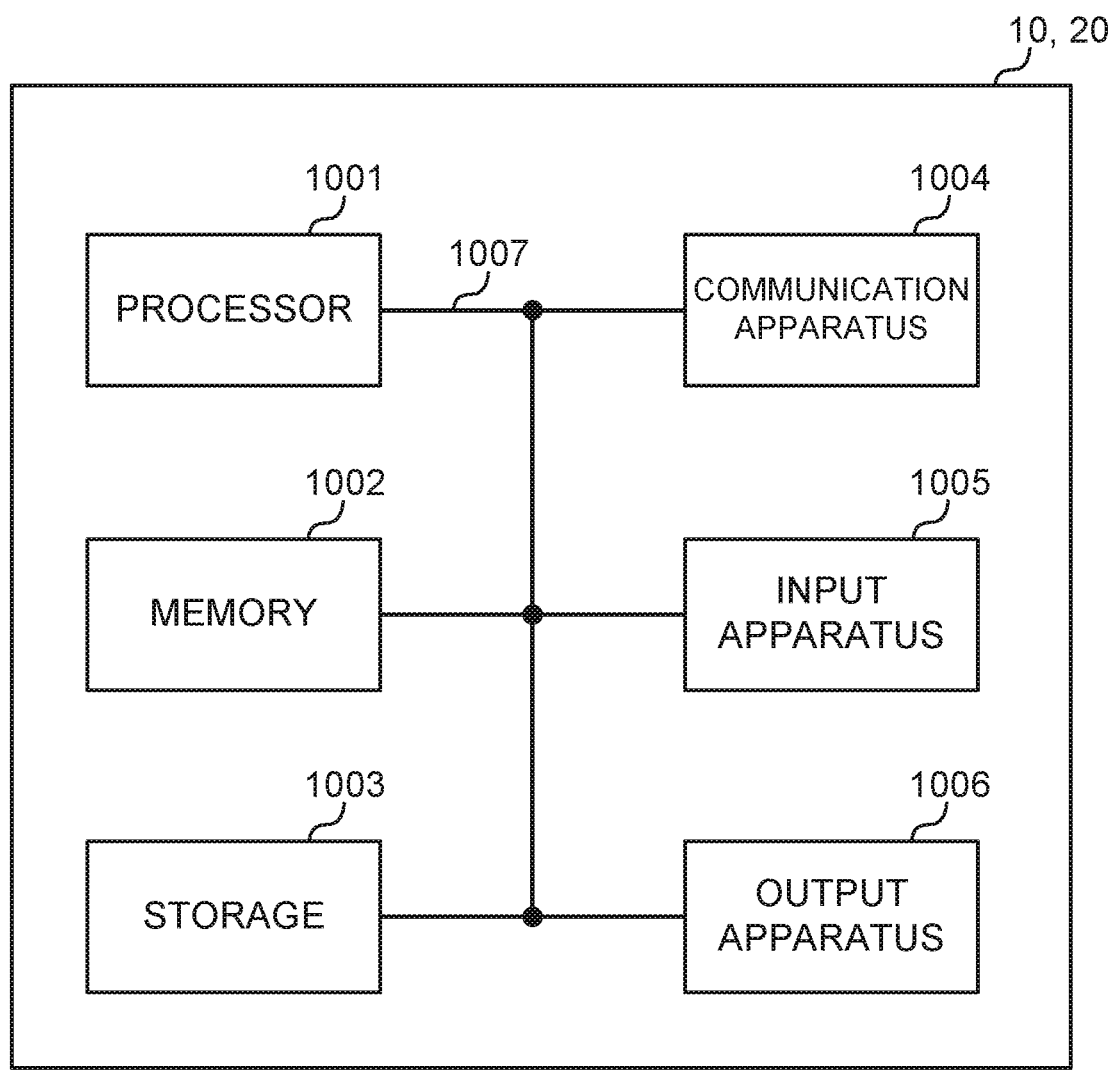
FIG. 15 is a diagram to show an example of a hardware structures of the base station and the user terminal according to one embodiment.

For example, a base station, a user terminal, and so on according to one embodiment of the present disclosure may function as a computer that executes the processes of the radio communication method of the present disclosure. FIG. 15 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmission power that are available for each user terminal) for the user terminal in TTI units. Note that the definitions of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a sub-frame, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRR may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP."

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mind-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be indicated by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so of at least one of these wired technologies and wireless technologies are also included in the definition of communication media.

The terms "system" and "network" used in the present disclosure are used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmission power," "phase rotation," an "antenna port," an "antenna port group," a "layer," "the number of layers," a "rank," "a resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed. by upper nodes. In a network including one or a plurality of network nodes with base stations, it is clear that various operations that are performed to communicate with. terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G) Future Radio Access (FRP), New-Radio Access Technology (RAT), New Radio (NR), New radio access (NX), Future generation radio access (FX), Global System for Mobile communications (GSM (registered trademark)), CDMA 2000, Ultra Mobile Broadband (UMB) IEEE 802.11 (Wi-Fi (registered trademark)), IEEE 802.16 (WiMAX (registered trademark)), IEEE 802.20, Ultra-WideBand (UWB), Bluetooth (registered trademark, systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified in other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making. "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected." or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupded," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described is the present disclosure. The invention according to the present disclosure can be implemented with various corrections and in various modifications, without departing from the spirit and scope of the invention defined by the recitations of claims. Consequently, the description of the present disclosure is provided only for the purpose of explaining. examples, and should by no means be construed to limit the invention according to the present disclosure in any way.

What is claimed is:

1. A terminal comprising:
   a receiver that receives information on a number of repetition of a physical uplink shared channel (PUSCH); and
   a processor that, when a PUSCH to which a repetition transmission is applied is divided into a plurality of PUSCHs and transmitted, determines, based on a first redundancy version which is applied to the PUSCH before division, a second redundancy version which is applied to each of the plurality of PUSCHs, wherein
   the processor controls to apply, to each of the plurality of PUSCHs, the same transmission power which is determined based on the PUSCH before division.

2. The terminal according to claim 1, wherein a part of the second redundancy version is the same as the first redundancy version.

3. The terminal according to claim 2, wherein the processor applies the part of the second redundancy version to a first PUSCH among the plurality of divided PUSCHs.

4. The terminal according to claim 1, wherein when the PUSCH is allocated across two slots, the processor divides the PUSCH into the plurality of PUSCHs based on a slot boundary.

5. The terminal according to claim 2, wherein when the PUSCH is allocated across two slots, the processor divides the PUSCH into the plurality of PUSCHs based on a slot boundary.

6. The terminal according to claim 3, wherein when the PUSCH is allocated across two slots, the processor divides the PUSCH into the plurality of PUSCHs based on a slot boundary.

7. A radio communication method for a terminal, comprising:
   receiving information on a number of repetition of a physical uplink shared channel (PUSCH);
   when a PUSCH to which a repetition transmission is applied is divided into a plurality of PUSCHs and transmitted, determining, based on a first redundancy version which is applied to the PUSCH before division, a second redundancy version which is applied to each of the plurality of PUSCHs; and
   controlling to apply, to each of the plurality of PUSCHs, the same transmission power which is determined based on the PUSCH before division.

8. A base station comprising:
   a transmitter that transmits information on a number of repetition of a physical uplink shared channel (PUSCH); and
   a processor that, when a PUSCH to which a repetition transmission is applied is divided into a plurality of PUSCHs and transmitted, controls a reception of the plurality of PUSCHs to which a second redundancy version is applied and transmitted, the second redundancy version being determined based on a first redundancy version which is applied to the PUSCH before division, wherein
   the processor controls to receive the plurality of PUSCHs, to each of which the same transmission power determined based on the PUSCH before division is applied.

9. A system comprising a terminal and a base station, wherein
   the terminal comprises:
      a receiver that receives information on a number of repetition of a physical uplink shared channel (PUSCH); and
      a processor that, when a PUSCH to which a repetition transmission is applied is divided into a plurality of PUSCHs and transmitted, determines, based on a first redundancy version which is applied to the PUSCH before division, a second redundancy version which is applied to each of the plurality of PUSCHs, wherein
      the processor controls to apply, to each of the plurality of PUSCHs, the same transmission power which is determined based on the PUSCH before division, and
   the base station comprises:
      a transmitter that transmits the information; and
      a processor that controls a reception of the plurality of PUSCHs.

* * * * *